US012147952B2

(12) United States Patent
Fritzhanns et al.

(10) Patent No.: US 12,147,952 B2
(45) Date of Patent: Nov. 19, 2024

(54) METHOD, TERMINAL, MONITORING ENTITY, AND PAYMENT SYSTEM FOR MANAGING ELECTRONIC COIN DATASETS

(71) Applicant: GIESECKE+DEVRIENT ADVANCE52 GMBH, Munich (DE)

(72) Inventors: Tilo Fritzhanns, Munich (DE); Florian Gawlas, Munich (DE); Wolfram Seidemann, Munich (DE); Maria Veleva, Munich (DE)

(73) Assignee: GIESECKE+DEVRIENT ADVANCE52 GMBH, Munich (DE)

( * ) Notice: Subject to any disclaimer, the term of this patent is extended or adjusted under 35 U.S.C. 154(b) by 0 days.

(21) Appl. No.: 17/801,913

(22) PCT Filed: Feb. 24, 2021

(86) PCT No.: PCT/EP2021/054541
§ 371 (c)(1),
(2) Date: Aug. 24, 2022

(87) PCT Pub. No.: WO2021/170643
PCT Pub. Date: Sep. 2, 2021

(65) Prior Publication Data
US 2023/0084651 A1    Mar. 16, 2023

(30) Foreign Application Priority Data
Feb. 25, 2020    (DE) ...................... 10 2020 104 904.8

(51) Int. Cl.
*G06Q 20/06*    (2012.01)
(52) U.S. Cl.
CPC ............................. *G06Q 20/0655* (2013.01)

(58) Field of Classification Search
CPC .................................................. G06Q 20/0655
See application file for complete search history.

(56) References Cited

U.S. PATENT DOCUMENTS

| | | |
|---|---|---|
| 6,609,114 B1 * | 8/2003 | Gressel ................ G06Q 20/105 705/50 |
| 10,586,223 B1 * | 3/2020 | Kloor ...................... G06F 21/64 |

(Continued)

FOREIGN PATENT DOCUMENTS

WO    2016200885 A1    12/2016

OTHER PUBLICATIONS

Yen Choon Ching et al., "FairCASH: Concepts and Framework," The Second International Conference on Next Generation Mobile Applications, Services and Technologies, IEEE, Sep. 16, 2008, pp. 269-274.

(Continued)

*Primary Examiner* — Scott C Anderson
(74) *Attorney, Agent, or Firm* — Workman Nydegger

(57) ABSTRACT

A method relates to a terminal for managing electronic coin datasets and to a corresponding terminal. The electronic coin datasets are output by a central issuer entity, wherein each electronic coin dataset has a test value, and the test value is incremented when the electronic coin dataset is directly transmitted between two terminals or the test value is invariant in the event of an action carried out by terminals on the electronic coin dataset. In the method, it is determined whether the electronic coin dataset is displayed by the terminal in the payment system or whether the electronic coin dataset is returned to the central issuer entity. A method in a payment system is provided for managing electronic coin datasets, to a corresponding payment system, and to a monitoring entity.

25 Claims, 13 Drawing Sheets

(56) References Cited

U.S. PATENT DOCUMENTS

| | | | |
|---|---|---|---|
| 2007/0027941 A1 | 2/2007 | Attila Becker-Szendy et al. | |
| 2011/0231313 A1* | 9/2011 | Robinson | G07D 7/202 |
| | | | 705/43 |
| 2012/0074217 A1* | 3/2012 | Block | G06Q 20/327 |
| | | | 235/379 |
| 2013/0054402 A1* | 2/2013 | Asherman | G06Q 30/06 |
| | | | 705/26.2 |
| 2013/0163414 A1* | 6/2013 | Ichiki | H04L 41/0893 |
| | | | 370/248 |
| 2014/0129440 A1* | 5/2014 | Smith | G06Q 20/4016 |
| | | | 705/43 |
| 2015/0149325 A1* | 5/2015 | Yamahara | G06Q 30/0635 |
| | | | 705/26.81 |
| 2017/0293912 A1 | 10/2017 | Furche et al. | |
| 2018/0268382 A1* | 9/2018 | Wasserman | H04L 9/3247 |

OTHER PUBLICATIONS

Simplot-Ryl et al., "Distributed Architectures for Electronic Cash Schemes: A Survey," International Journal of Parallel, Emergent and Distributed Systems, vol. 24, No. 3, Jun. 2, 2009, 30 pages.
Search Report from corresponding German Application No. DE 102020104904.8, Jan. 20, 2021.
International Search Report from PCT Application No. PCT/EP2021/054541, May 18, 2021.

* cited by examiner

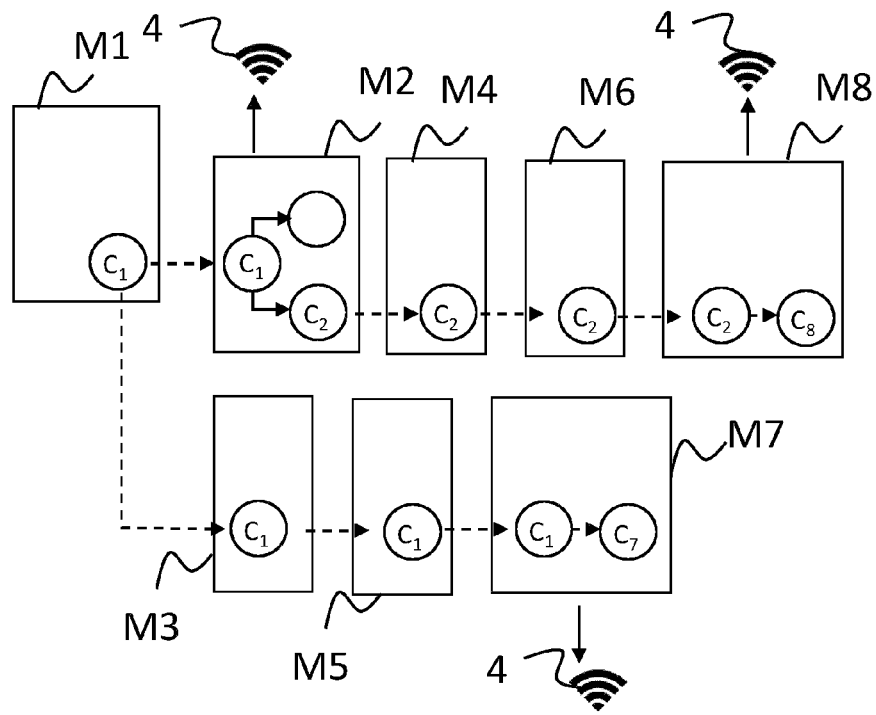
Fig. 1a – Prior art
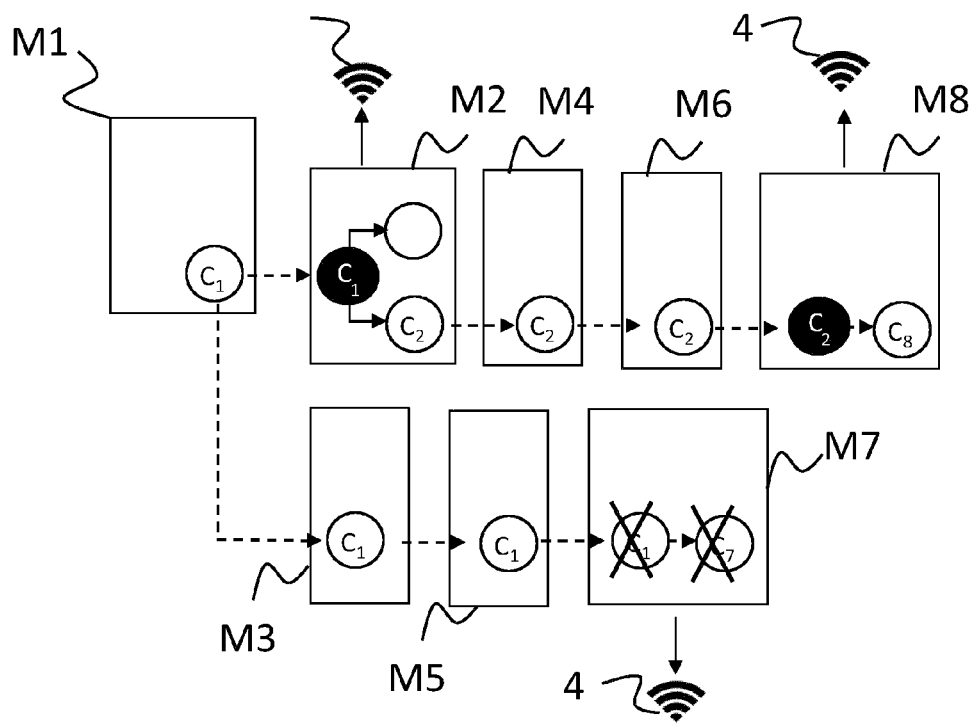
Fig. 1b – Prior art

330

| Command | $O_1$ | $O_2$ | $S_1$ | $S_2$ | Signature | O-Flag | C-Flag | R-Flag | S-Flag |
|---|---|---|---|---|---|---|---|---|---|
| Generate | - | - | $Z_i$ | - | $[Z_i]Sig_I$ | - | - | - | [0,1] |
| Return | $Z_i$ | - | - | - | $[Z_i]Sig_I$ | [0,1] | - | - | [0,1] |
| Split | $Z_i$ | - | $Z_j$ | $Z_k$ | Sig | [0,1] | [0,1] | [0,1] | [0,1] |
| Merge | $Z_i$ | $Z_j$ | - | $Z_m$ | Sig 1,2 | [0,1] | [0,1] | [0,1] | [0,1] |
| Switch | $Z_k$ | - | - | $Z_l$ | Sig | [0,1] | [0,1] | [0,1] | [0,1] |

Fig. 7

METHOD, TERMINAL, MONITORING ENTITY, AND PAYMENT SYSTEM FOR MANAGING ELECTRONIC COIN DATASETS

TECHNICAL FIELD OF THE INVENTION

The invention concerns a method in a terminal for managing electronic coin data sets, as well as a corresponding terminal. Further, the invention concerns a method in a payment system for managing electronic coin data sets, as well as a corresponding payment system

TECHNICAL BACKGROUND OF THE INVENTION

Security of payment transactions and associated payment transaction data means both protection of the confidentiality of the exchanged data; and protection of the integrity of the exchanged data; and protection of the availability of the exchanged data.

For electronic coin data sets, it must be possible to demonstrate basic control functions, specifically (1) detection of multiple spending attempts, also called double-spending, and (2) detection of uncovered payments. In case (1), someone attempts to issue the same coin data set multiple times, and case (2), someone attempts to issue a coin data set even though they have no credit (left).

To illustrate case (1), FIG. 1a and FIG. 1b represent a payment system in which it is possible to exchange a monetary amount in the form of electronic coin data sets directly between terminals in the payment system. In the case of direct transmitting, no central entity 4 is then involved. In FIG. 1a, a terminal M1 has a coin data set $C_1$. The terminal M1 unauthorizedly transmits the coin data set $C_1$ to the terminals M2 and M3 simultaneously.

In the payment system of FIG. 1a, the terminal M2 optionally shares the coin data set $C_1$ and receives the coin data set $C_2$, which is then directly passed on to the terminal M4. The terminal M4 passes the coin data set $C_2$ directly on to terminal M6. The terminal M6 passes the coin data set $C_2$ directly on to the terminal M8. The unsuspecting subscriber with terminal M3 passes the coin data set $C_1$ directly on to terminal M5. The terminal M5 passes the coin data set $C_1$ directly on to the terminal M7. Thus, both coin data sets $C_1$ and $C_2$ change owners frequently without the central monitoring entity 4 knowing. The terminals M3 to M7 were only temporary owners of the coin data set registered to another terminal.

FIG. 1b additionally indicates the status (or state) of the coin data sets from the point of view of a central monitoring entity 4. The coin data set $C_1$ in the terminal M2 is usually already invalid after sharing and is therefore shown inverted (with filling). When the terminal M8 has the coin data set $C_2$ registered to it in the central monitoring entity 4 (=switch or switch), the coin data set $C_2$ also becomes invalid and a coin data set $C_8$ becomes valid. When now also the terminal M7 wants to register its coin data set $C_7$ to the entity 4 instead of the coin data set $C_1$, the monitoring entity 4 detects that the coin data set $C_1$ is already invalid. The problem caused by M1 is only now discovered. As a result, the monitoring entity 4 does not accept either the coin data set $C_1$ or the coin data set $C_7$. This is indicated in FIG. 1b by a cross above the coin data sets. A comparable situation arises when, in another sequence, the terminal M2 does not share the coin data set $C_1$ but passes it on directly and the terminal M8 registers the received coin data set, then also the coin data set $C_1$, with the monitoring entity 4 for itself in time before the terminal M7.

In addition, due to the plurality of transactions of an electronic coin data set and also due to the advancing service life, the risk of manipulation(s) being carried out on the electronic coin data set increases.

In the future, it should be possible to dispense with cash (banknotes and analog coins) altogether, or at least with analog coins.

It is therefore the task of the present invention to create a method and a system in which a payment transaction is designed to be secure yet simple. In particular, a direct and anonymous payment between apparatuses, such as tokens, smartphones but also machines, such as point-of-sale terminals or vending machines, is to be created. Several coin data sets are to be able to be combined and/or divided at the user arbitrarily with one another, in order to make a flexible exchange possible. The exchanged coin data sets are to be confidential to other system participants, but allow each system participant to perform basic checks on the coin data set, namely (1) detecting multiple spend attempts; (2) detecting attempts to pay with non-existent monetary amounts; and (3) detecting return criteria for previously spent coin data sets, such as that a coin data set is to expire.

SUMMARY OF THE INVENTION

The tasks posed are solved with the features of the independent patent claims. Further advantageous embodiments are described in the dependent patent claims.

The task is solved in particular by a method in a terminal for managing electronic coin data sets of a payment system. The electronic coin data sets are issued by a central issuing entity, wherein each electronic coin data set has a check value. The check value is incremented when the electronic coin data set is transmitted directly between two terminals, or the check value is invariant to an action performed by terminals on the electronic coin data set. The method comprises the step of: determining by the terminal, based on the check value of an electronic coin data set, whether that electronic coin data set is displayed by the terminal at the payment system or determining by the terminal, based on the check value of the electronic coin data set, whether the electronic coin data set is returned to the central issuing entity.

An electronic coin data set is in particular an electronic data set that represents a monetary (=pecuniary) amount and is also colloquially referred to as a "digital coin" or "electronic coin", in English referred to as "digital/electronic Coin". This monetary amount changes from one terminal to another in the process. In the following, a monetary amount is understood to be a digital amount that can, e.g., be credited to an account of a financial institution or exchanged for another means of payment. An electronic coin data set thus represents cash in electronic form.

The terminal may have a plurality of electronic coin data sets, for example, the plurality of coin data sets may be stored in a data storage of the terminal. The data storage then represents, for example, an electronic wallet. The data storage may be, for example, internal, external, or virtual.

For example, the terminal may be a passive apparatus, such as a token, a mobile terminal, such as a smartphone, a tablet computer, a computer, a server, or a machine.

An electronic coin data set for transmitting monetary amounts is substantially different from an electronic data set for exchanging data or transferring data, for example, because a traditional data transaction is based on a question-answer principle or on intercommunication between the data transfer parties. An electronic coin data set, on the other hand, is unique and stands in the context of a security concept, which can comprise masking, signatures or encryption, for example. In principle, an electronic coin data set contains all the data required by a receiving entity for verification, authentication and forwarding to other entities. Intercommunication between terminals during exchange is therefore basically not required for this type of data set.

The electronic coin data set is issued by a central issuing entity. The issuing can be done upon direct request of the terminal. The central issuing entity, for example a central bank, generates the electronic coin data set and issues it directly to the terminal. In one embodiment, the electronic coin data set is issued to the terminal indirectly via the payment system. Multiple central issuing entities may be provided in the payment system, and the number of issuing entities is not limited. For example, a coin data set may be issued by a first issuing entity in a first currency and a coin data set may be issued by another issuing entity in a different currency.

The check value of the electronic coin data set is used in the method to enable or improve a control function in the payment system. The check value is preferably a data element of the electronic coin data set that can be read by the terminal and whose value can be determined by the terminal. The check value is coupled to this electronic coin data set.

In a first embodiment, the check value is incremented, i.e. increased stepwise, when the electronic coin data set is transmitted directly between two terminals. The incrementing either occurs by a sending terminal immediately before the coin data set is sent to a receiving terminal. Or the incrementing occurs in the receiving terminal immediately after the coin data set is received. Thus, the number of direct transmissions between terminals is recorded for each coin data set.

In a second (alternative to the first) embodiment, the check value is invariant to an action performed by terminals on the electronic coin data set (action invariant). Action invariant means that when an action is performed on the coin data set, the check value remains unchanged. The action invariant check value is not individual to the electronic coin data set, but is group specific and therefore applies to a plurality of different coin data sets to maintain anonymity and prevent coin data set tracking.

An action with a coin data set is any modification made to the coin data set by a terminal, i.e., in particular, switching, splitting, combining, as will be described later. In addition, each transmitting of the coin data set, for example to another terminal or also to an entity in the payment system is meant as an action. In addition, the action is meant to be redeeming the coin data set to credit a monetary amount of the coin data set or changing the currency system. These actions are performed by a terminal and do not change the check value.

Based on the check value of the electronic coin data set, the terminal determines whether this electronic coin data set is displayed (=reported) to the payment system. For example, when the number of transmissions between terminals exceeds a predefined threshold value, the coin data set is thus displayed to the payment system. In an exemplary embodiment of the method, the displaying corresponds to sending a switching command to a monitoring entity of the payment system to initiate there a switching of the coin data set to the terminal sending the coin data set. In an alternative exemplary embodiment of the method, the display initiates a marking of the coin data set in a monitoring entity of the payment system. The check value and/or the coin data set may, but need not, be transmitted to the payment system for the purpose of display. The return of the electronic coin data set by the terminal conditions either the redeeming of a monetary amount associated with the electronic coin data set or the issuing of a new electronic coin data set with an identical monetary amount.

The return of the electronic coin data set by the terminal may trigger a reset or deletion of all entries in the payment system that exist for the electronic coin data set. This deletes digital traces of the electronic coin data set and safeguards the anonymity of the process.

Alternatively, based on the check value of the electronic coin data set, the terminal determines whether the electronic coin data set is returned to the central issuing entity. Thus, the check value can be used to define a criterion for returning an electronic coin data set. In this way, electronic coin data sets can expire based on, for example, their lifetime or the number of actions performed with the coin data set to increase security at the payment system.

In a preferred embodiment, the electronic coin data set is returned to the central issuing entity as a result of being displayed by the payment system. Thus, displaying to the payment system determines in the payment system whether the coin data set is to be returned. In this embodiment, determining whether a return has to occur is performed in the payment system instead of the terminal. The result of the determining is communicated to the terminal and the terminal is requested by the payment system to return the electronic coin data set.

In a preferred embodiment, the payment system requests modifying of the electronic coin data set as a result of the display. Modifying, such as splitting, combining, or switching, requires registering the electronic coin data set in the payment system. In many embodiments of the digital currency system, a return to the issuing entity is not necessary and sometimes not useful. This is especially true when the coin data set was modified quickly after it was issued. In this embodiment, the coin data set is not returned, but it is considered returned.

In a preferred embodiment, a counter value in the payment system concerning this electronic coin data set is determined as a result of being displayed by the payment system using the check value of the electronic coin data set. The check value of the coin data set is preferably transmitted from the terminal to the payment system. In this case, the counter value is not part of the coin data set. Preferably, the counter value is managed in the payment system. Preferably, the counter value is incremented with each action (modification, transmission, redeeming) concerning the electronic coin data set. Preferably, the counter value is incremented with different weighting for different actions. This makes it possible to control the return in an improved way according to different actions. Thus, in the coin data set, the check value is provided as a data element that is incremented, in particular, with each direct transmission between terminals. The counter value in the payment system incorporates the check value, for example by adding the previous counter value to the check value.

In a preferred embodiment, each electronic coin data set has a first check value and a second check value. The first check value is then incremented accordingly when the electronic coin data set is transmitted directly between two terminals, wherein based on the first check value of the electronic coin data set, it is determined whether the electronic coin data set is displayed by the terminal at the payment system. Based on at least the second check value of the electronic coin data set, it is determined whether the electronic coin data set is returned to the central issuing entity. Thus, a display check value is provided separately from a return check value in the coin data set.

Preferably, the second check value is invariant to an action performed by terminals on the electronic coin data set, wherein preferably the second check value is at least one value from the following list: return date of the electronic coin data set; issuance date of the electronic coin data set; registration date of the electronic coin data set; and identification value of the electronic coin data set. The action invariant check value is not individual to the electronic coin data set, but is group specific and therefore applies to a plurality of different coin data sets to maintain anonymity and prevent coin data set tracking. The second action invariant check value is not individual to the electronic coin data set, but applies to a plurality of different coin data sets (group ID) to maintain anonymity and prevent coin data set tracking.

In an advantageous embodiment, the second check value is variable and comprises the first check value to determine whether the electronic coin data set is returned. A sum could be formed and this sum compared to a predefined threshold value. For example, the number of direct transmissions could be a return criterion, so that no infrastructure for evaluating the coin data sets with respect to the return of the coin data set would have to be maintained in the payment system, thus enabling a simpler and more secure management while creating the control functions.

In an advantageous embodiment, the exceeding of a threshold value of the check value of the electronic coin data set is detected by a first terminal and an action with this electronic coin data set, in particular the direct transmission of this electronic coin data set from the first terminal to a second terminal, is only performed when it has been detected in the first terminal that no other electronic coin data set is present in the first terminal. In this way, it is ensured that a payment transaction between two terminals can still be performed and completed with the coin data set despite a high number of direct transmissions of this coin data set between terminals in the absence of alternative coin data sets in the terminal.

In an advantageous embodiment, the exceeding of a blocking threshold value of the check value of the electronic coin data set is detected by a first terminal and an action with this electronic coin data set, in particular the direct transmitting of this electronic coin data set from the first terminal to a second terminal, is blocked, regardless of whether another electronic coin data set is present in the first terminal or not. Thus, a threshold value is defined at which direct forwarding (transmitting) between terminals is completely prevented (blocked). For example, this coin data set could be stored in a secure storage area, where only a return process but no action process of the terminal has access.

The threat of blocking may be detected in advance by the terminal and communicated to a user of the terminal to stop the coin data set from being blocked by immediately returning the coin data set. Additionally or alternatively, the terminal may return the electronic coin data set upon detecting that the blocking threshold value has been exceeded.

Preferably, the threshold value of the check value is less than the blocking threshold value of the check value. The blocking threshold value may be a multiple of the threshold value to avoid blocking the coin data set too soon. For example, the threshold value is ten, or for example five, or for example 3. Accordingly, the blocking threshold value is 30, or for example 15, or for example 10.

In a preferred embodiment, the issuing entity queries check values of coin data sets at predefined periodic intervals or in a targeted manner and automatically requests an electronic coin data set back when a check value of the electronic coin data set is exceeded.

The task is further solved by a monitoring entity, arranged to manage an electronic coin data set, wherein the electronic coin data set has been issued by a central issuing entity, wherein a check value is available for each electronic coin data set, wherein the check value is incremented upon direct transmitting of the electronic coin data set between two terminals or wherein the check value is invariant upon an action performed by terminals on the electronic coin data set, wherein the monitoring entity is arranged to determine, based on the check value of the electronic coin data set, whether the electronic coin data set is returned; and/or marking the coin data set, wherein the check value and/or the coin data set has been sent for the purpose of displaying.

The task is further solved by a terminal. The terminal has a computing unit arranged to manage electronic coin data sets according to the method described above. The terminal also has means for accessing a data storage, wherein at least one electronic coin data set is stored in the data storage. And the terminal has an interface arranged for issuing the at least one electronic coin data set to another terminal and/or for displaying the electronic coin data set to the payment system and/or for returning the electronic coin data set.

The task is further solved by a method in a payment system, in particular a commercial bank or a monitoring entity of the payment system, for managing electronic coin data sets, wherein the electronic coin data sets are issued by a central issuing entity, wherein for each electronic coin data set there is a check value, wherein the check value is incremented upon direct transmitting of the electronic coin data set between two terminals or wherein the check value is invariant upon an action performed by terminals on the electronic coin data set, wherein the method comprises the step of: Determining, by the payment system, based on the check value of the electronic coin data set, whether the electronic coin data set is returned.

In the method in the payment system, only masked electronic coin data sets are preferably managed. Masking of the coin data sets is described later and ensures anonymity in the payment system.

In a preferred embodiment, the electronic coin data set is provided for transmitting between two terminals, wherein the electronic coin data set to be transmitted is returned to the issuing entity by the payment system as a result of the determining, and wherein an electronic coin data set of the payment system or a newly issued electronic coin data set is transmitted instead of the electronic coin data set to be transmitted. Reference is made to the above advantages in such a method.

In a preferred embodiment, the electronic coin data set is provided for transmitting between two terminals, wherein the payment system requests the return of the electronic coin data set to be transmitted from a (sending or receiving) terminal to the issuing entity.

In a preferred embodiment, the payment system determines a counter value in the payment system concerning the electronic coin data set using the check value of the electronic coin data set. If a threshold value of the counter value is exceeded, the electronic coin data set is returned (directly or indirectly) to the central issuing entity. In this context, the payment system preferably manages only masked coin data sets. The issuing entity or the payment system requests the corresponding coin data set from the terminal or provides a corresponding information from the payment system to the terminal for (direct) return. The counter value is preferably incremented with each action on the electronic coin data set, wherein preferably for different actions the counter value is incremented with different weighting. Reference is made to the above advantages in such a method.

In a preferred embodiment, each electronic coin data set has a check value that is invariant to an action performed by terminals on the electronic coin data set, wherein this check value is stored in the payment system for checking the return by the payment system, and wherein preferably the check value is at least one value from the following list: return date of the electronic coin data set; issuance date of the electronic coin data set; registration date of the electronic coin data set; and identification value of the electronic coin data set.

In a preferred embodiment, when an action is performed on the electronic coin data set by the payment system, the check value of the electronic coin data set is reset by the payment system. This simplifies the method, as the terminal does not need to be adjusted to the sum of all allowed actions, but only to the sum of successively allowed direct transmissions.

In a preferred embodiment, when electronic coin data sets are combined (=merged) to form a combined electronic coin data set, the payment system determines the highest check value of the electronic coin data sets and adopts this highest check value as the check value of the combined electronic coin data set.

In a preferred embodiment, when combining electronic coin data set data into a combined electronic coin data set, a new check value is determined by the payment system from the sum of all check values of the electronic coin data set data divided by the product of the number of coin data sets with a constant correction value, wherein said new check value is adopted as the check value of the combined electronic coin data set, wherein said correction value is greater than or equal to 1, and wherein preferably said correction value depends on a maximum deviation of the individual check values of the electronic coin data sets or on a maximum check value of one of the electronic coin data sets, wherein further preferably said correction value is less than or equal to 2. The correction value is constant throughout the payment system.

In a preferred embodiment, the return of the electronic coin data set from the payment system to the issuing entity occurs when the terminal initiates the redeeming of a monetary amount of the electronic coin data set to an account of the payment system and/or when the terminal requests a change of the monetary amount of the electronic coin data set to another currency system of the payment system.

The task is further solved by a payment system comprising a monitoring entity, a first terminal and at least a second terminal, wherein an issuing entity is adapted to create an electronic coin data set for the payment system, wherein the payment system is adapted to perform the method for managing electronic coin data sets according to the method described above.

Preferably, the payment system is arranged to manage electronic coin data sets for managing electronic coin data sets from further issuing entities and/or monetary amounts as book money.

In an advantageous embodiment, the electronic coin data set has, in addition to the check value, a monetary amount, i.e., a date representing a monetary value of the electronic coin data set, and an obfuscation amount, such as a random number. In addition, the electronic coin data set may have other metadata, such as what currency the monetary amount represents. An electronic coin data set is uniquely represented by these at least three pieces of data (monetary amount, obfuscation amount, check value). Anyone who has access to these three data of an electronic coin data set can use this electronic coin data set for payment. Thus, knowing these three values (monetary amount, obfuscation amount, check value) is equivalent to owning the digital money. This electronic coin data set can be transmitted directly between two terminals. In one embodiment of the invention, only the transmission of the monetary amount, the obfuscation amount, and the check value is required to exchange digital money.

In a preferred embodiment, a corresponding masked electronic coin data set is associated with each electronic coin data set in the method and payment system. Knowledge of a masked electronic coin data set does not authorize issuance of the digital money represented by the electronic coin data set. This represents a key difference between masked electronic coin data sets and (non-masked) electronic coin data sets. A masked electronic coin data set is unique and also uniquely associated with an electronic coin data set, so there is a 1-to-1 relationship between a masked electronic coin data set and a (non-masked) electronic coin data set. Masking of the electronic coin data set is preferably performed by a computing unit of the terminal within the terminal. The terminal has at least one electronic coin data set. Alternatively, masking may be performed by a computing unit of the terminal receiving the electronic coin data set.

When issuing an electronic coin data set from the issuing entity to a terminal, a masked electronic coin data set may be issued in parallel by the issuing entity to the payment system, for example a monitoring entity of the payment system, for registration of the electronic coin data set.

This masked electronic coin data set is obtained by applying a one-way function, for example a homomorphic one-way function, for example a cryptographic function. This function is a one-way function, i.e., a mathematical function that is "easy" to compute in terms of complexity theory, but "difficult" to practically impossible to reverse. Here under one-way function also a function is designated, to which up to now no inversion practically executable in appropriate time and with justifiable expenditure is known. Thus, the calculation of a masked electronic coin data set from an electronic coin data set is comparable to or equivalent to the generation of a public key in an encryption method via a residue class group. Preferably, a one-way function is used that operates on a group in which the discrete logarithm problem is difficult to solve, such as a cryptographical method analogous to an elliptic curve encryption, or ECC, from a private key of a corresponding cryptographic method. The reverse function, i.e., the generation of an electronic coin data set from a masked electronic coin data set (or the part of the electronic coin data set), is thereby—equivalent to the generation of the private key from a public key in an encryption method over a residue class group—very time-consuming. When in the present document sums and differences or other mathematical operations are mentioned, then in the mathematical sense the respective operations on the corresponding mathematical group are to be understood, for example the group of points on an elliptic curve.

In one embodiment, the one-way function is homomorphic, i.e., a cryptographical method that has homomorphism properties. Thus, mathematical operations can be performed on the masked electronic coin data set that can also be performed in parallel on the (unmasked) electronic coin data set and thus be traced. Using the homomorphic one-way function, calculations with masked electronic coin data sets can be traced in the monitoring entity without the corresponding (non-masked) electronic coin data sets being known there. Therefore, certain calculations with electronic coin data sets, for example for a processing of the (non-masked) electronic coin data set (for example splitting or merging), can also be proven in parallel with the corresponding masked electronic coin data sets, for example for validation checks or for monitoring about the legitimacy of the respective electronic coin data set. The homomorphism properties apply at least to addition and subtraction operations, so that a splitting or combining (=merging) of electronic coin data sets can also be recorded in the monitoring entity by means of the corresponding masked electronic coin data sets and can be traced by requesting terminals and/or by the monitoring entity without gaining knowledge about the monetary amount and the performing terminal.

Thus, the homomorphism property allows registration of valid and invalid electronic coin data sets based on their masked electronic coin data sets to be maintained in a monitoring entity without knowledge of the electronic coin data sets even when those electronic coin data sets are being processed (split, merged, switched). This ensures that no additional monetary amount has been created or that an identity of the terminal is recorded in the monitoring entity. Masking enables a high level of security without providing visibility into the monetary amount or the terminal. Thus, a two-layer payment system results. On the one hand, there is the processing layer, in which masked electronic data sets are checked, and on the other hand, there is the direct transaction layer, in which at least two terminals transmit electronic coin data sets.

In a further embodiment, the one-way function is a cryptographical encryption function.

Applying the one-way function to the electronic coin data set also comprises applying the one-way function to a part of the electronic coin data set, in particular to the obfuscation amount, in one embodiment only to the obfuscation amount.

When transmitting an electronic coin data set directly from the first terminal to the second terminal, two terminals have knowledge of the electronic coin data set. In order to prevent the sending first terminal from also using the electronic coin data set at another (third) terminal for payment (so-called double-spending), a switch ("Switch") of the transmitted electronic coin data set from the first terminal to the second terminal can be executed. The switch can preferably occur automatically when an electronic coin data set is received in the second terminal. In addition, it may also occur upon request, for example, a command from the first and/or second terminal. Additionally, it may also occur upon request, such as a command from the first and/or second terminal. Additionally, an electronic coin data set may also be split into at least two coin data sets ("Split"). Additionally, two electronic coin data sets can be merged into one coin data set ("Merge").

Switching, splitting and merging are different modifications to an electronic coin data set, i.e. actions on the electronic coin data set. These modifications require registering the masked coin data set in the payment system, for example in a monitoring entity. This registration in the course of the modifications causes the electronic coin data set sent by the first terminal to become invalid and to be recognized as correspondingly invalid in a second issuance attempt by the first terminal. The coin data set to be registered by the second terminal becomes valid by being registered in the monitoring entity. The specific performance of each modification will be explained later.

Switching also takes place when an electronic coin data set has been modified, for example split or merged with other electronic coin data sets, in particular to be able to suitably settle a monetary amount to be paid. In doing so, the payment system should always be able to pay any monetary amount.

Splitting and subsequent registration has the advantage that an owner of the at least one electronic coin data set is not forced to always transmit the entire monetary amount at once, but to now form and transmit corresponding partial monetary amounts. The monetary amount can be split as long as all electronic coin data subsets have a positive monetary amount that is less than the monetary amount of the electronic coin data set from which to split and the sum of the electronic coin data subset is equal to the electronic coin data subset to be split. Alternatively or additionally, fixed denominations may be used.

The method preferably has the further following steps: Switching the transmitted electronic coin data set; and/or merging the transmitted electronic coin data set to a second electronic coin data set to form a further electronic coin data set, namely merged electronic coin data set.

Upon switching, the electronic coin data subset received from the first terminal results in a new electronic coin data set, preferably with the same monetary amount, called the electronic coin data set to be switched. The new electronic coin data set is generated by the second terminal, preferably by using the monetary amount of the received electronic coin data set as the monetary amount of the electronic coin data set to be switched. In the process, a new obfuscation amount, such as a random number, is generated. The new obfuscation amount is added to the obfuscation amount of the received electronic coin data set, for example, so that the sum of both obfuscation amounts (new and received) serves as the obfuscation amount of the electronic coin data set to be switched. After the switching, the received electronic coin data subset and the electronic coin data subset to be switched are preferably masked in the terminal by applying, for example, the homomorphic one-way function to the received electronic coin data subset and the electronic coin data subset to be switched, respectively, to obtain a masked received electronic coin data subset and a masked electronic coin data subset to be switched, respectively.

The switching is thus secured by adding a new obfuscation amount to the obfuscation amount of the received electronic coin data set, thereby obtaining an obfuscation amount known only to the second terminal. Newly created obfuscation amounts must have a high entropy since they are used as a blinding factor for the corresponding masked electronic coin data subset. Preferably, a random number generator on the terminal is used for this purpose. This protection can be tracked in the monitoring entity.

As part of the switching process, preferred additional information needed to register the switching of the masked electronic coin data set in the remote monitoring entity is computed in the terminal. Preferably, the additional information includes a range proof of the masked electronic coin data set to be switched and a range proof of the masked received electronic coin data set. The range proof is a proof that the monetary amount of the electronic coin data set is non-negative, the electronic coin data set is validly created, and/or the monetary amount and the obfuscation amount of the electronic coin data set are known to the creator of the range proof. Specifically, the range proof is used to provide such proof(s) without revealing the monetary amount and/or the obfuscation amount of the masked electronic coin data set. These range proofs are also called "zero-knowledge range proofs." Preferred range proofs used are ring signatures. Subsequently, a registration of the switching of the masked electronic coin data set is performed in the remote monitoring entity.

Preferably, the registering step is performed when the second terminal is connected to the monitoring entity. While the electronic coin data sets are used for direct payment between two terminals, the masked coin data sets are registered with the pseudonym in the monitoring entity.

In a further preferred embodiment of the method, a further electronic coin data set (merged electronic coin data set) is determined from a first and a second electronic coin data subset for a merging of electronic coin data subsets. Thereby, the obfuscation amount for the electronic coin data set to be merged is calculated by forming the sum of the respective obfuscation amounts of the first and the second electronic coin data set. Furthermore, preferably, the monetary amount for the connected electronic coin data set is calculated by forming the sum of the respective monetary amounts of the first and second electronic coin data sets.

After merging, the first electronic coin data subset, the second electronic coin data subset, and the electronic coin data set to be merged are stored in the (first and/or second) terminal by applying the, for example, homomorphic one-way function to each of the first electronic coin data subset, the second electronic coin data subset, and the electronic coin data set to be merged, respectively, to obtain a masked first electronic coin data subset, a masked second electronic coin data subset, and a masked electronic coin data set to be merged, respectively. Further, additional information needed to register the merging of the masked electronic coin data sets in the remote monitoring entity is computed in the terminal. Preferably, the additional information includes a range proof about the masked first electronic coin data subset and a range proof about the masked second electronic coin data subset. The range proof is a proof that the monetary amount of the electronic coin data set is non-negative, the electronic coin data set is validly created, and/or the monetary amount and obfuscation amount of the electronic coin data set are known to the creator of the range proof. Specifically, the range proof is used to provide such proof(s) without revealing the monetary value and/or the obfuscation amount of the masked electronic coin data set. These range proofs are also called "zero-knowledge range proofs." Preferred range proofs used are ring signatures. This is followed by registering the merging of the two masked electronic coin data subsets in the remote monitoring entity.

The merging step can be used to combine two electronic coin data sets or two electronic coin data subsets. In this process, the monetary amounts as well as the obfuscation amounts are added together. Thus, as with splitting, validity of the two original coin data sets can be performed during merging.

In a preferred embodiment, the registering step comprises receiving the masked electronic coin data subset to be switched in the monitoring entity, checking the masked electronic coin data subset to be switched for validity; and registering the masked electronic coin data set to be switched in the monitoring entity when the checking step is successful, whereby the electronic coin data subset to be switched is deemed to be checked.

The payment system is preferably provided with at least two layers and has a direct payment transaction layer, for direct exchange of (non-masked) electronic coin data sets, and a monitoring layer (the monitoring entity of the payment system), which may also be referred to as an "obfuscated electronic data set ledger". In the monitoring entity, the monitoring layer, preferably no payment transactions are recorded, but only masked electronic coin data sets, their check values or counter values and their modifications for the purpose of verifying the validity of (non-masked) electronic coin data sets. This ensures the anonymity of the participants in the payment system. The monitoring entity provides information about valid and invalid electronic coin data sets, for example, to avoid multiple issuance of the same electronic coin data set, or to verify the authenticity of the electronic coin data set as validly issued electronic money, or to record the sum of monetary amounts per terminal in order to compare this sum with a threshold value and to prevent or allow modification accordingly. Based on the counter value of an electronic coin data set, the monitoring entity determines whether the electronic coin data set has expired and is to be returned, or is to be modified accordingly so that it is considered returned.

In the present case, the terminal may have or be a security element in which the electronic coin data sets are securely stored. A security element is preferably a special computer program product, in particular in the form of a secure runtime environment within an operating system of a terminal, English Trusted Execution Environments, TEE, stored on a data storage, for example a mobile terminal, a machine, preferably ATM. Alternatively, the security element is, for example, in the form of special hardware, in particular in the form of a secured hardware platform module, English Trusted Platform Module, TPM, or as an embedded security module, eUICC, eSIM. The security element provides a trusted environment.

The communication between two terminals can be wireless or wired, or e.g. also via optical path, preferably via QR code or barcode, and can be adapted as a secured channel. The optical path can comprise, for example, the steps of generating an optical code, in particular a 2D code, preferably a QR code, and reading the optical code. Thus, the exchange of the electronic coin data set is secured, for example, by cryptographic keys, such as a session key negotiated for an electronic coin data set exchange or a symmetric or asymmetric key pair.

By communicating between terminals, for example via their security elements, the exchanged electronic coin data sets are protected from theft or tampering. The security element layer thus complements the security of established blockchain technology.

In a preferred embodiment, the coin data sets are transmitted as APDU commands. For this purpose, the coin data set is preferably stored in an (embedded) UICC as a security element and is managed there. An APDU is a combined command/data block of a connection protocol between the UICC and an apparatus. The structure of the APDU is defined by the ISO-7816-4 standard. APDUs represent an information element of the application layer (layer 7 of the OSI layer model).

In addition, it is advantageous that the electronic coin data sets can be transmitted in any format. This implies that they can be communicated, i.e. transmitted, on arbitrary channels. They do not have to be stored in a determined format or in a determined program.

In particular, a mobile telecommunications terminal, for example a smartphone, is regarded as a terminal. Alternatively or additionally, the terminal can also be an apparatus, such as a wearable, smart card, machine, tool, vending machine or even container or vehicle. A terminal according to the invention is thus either stationary or mobile. The terminal is preferably adapted to use the Internet and/or other public or private networks. For this purpose, the terminal uses a suitable connection technology, for example Bluetooth, LoRa, NFC and/or WiFi, and has at least one corresponding interface. The terminal may also be adapted to be connected to the Internet and/or other networks by means of access to a mobile network.

In one embodiment, it may be provided that the first and/or second terminal processes the received electronic coin data sets according to their monetary value when multiple electronic coin data sets are present or received in the methods shown. Thus, it may be provided that electronic coin data sets with higher monetary value are processed before electronic coin data sets with lower monetary value. In one embodiment, the first and/or second terminal may be adapted, after receiving an electronic coin data set, to merge it with electronic coin data sets already present in the second terminal, depending on attached information, such as a currency or denomination, and to perform an merging step accordingly. Furthermore, the second terminal may also be adapted to automatically perform a switching after receiving the electronic coin data set from the first terminal.

In one embodiment, further information, in particular metadata, is transmitted from the first terminal to the second terminal during the transmission, for example a currency. In one embodiment, this information may be comprised by the electronic coin data set.

The methods are not limited to a currency. For example, the payment system may be arranged to manage different currencies from different issuing entities. For example, the payment system is arranged to convert (=change) an electronic coin data set of a first currency into an electronic coin data set of another currency. This change is also a modification of the coin data set. With the change, the original coin data set becomes invalid and is considered returned. Flexible payment with different currencies is thus possible and user-friendliness is incremented.

The methods also enable the electronic coin data set to be converted into book money, for example, by redeeming the monetary amount to an account of the participant in the payment system. This conversion is also a modification. Upon redeeming, the electronic coin data set becomes invalid and is considered returned.

In a preferred embodiment, the monitoring entity is a remote entity. This provides, for example, for the establishment of a communication link to the monitoring entity for the purpose of registering the electronic coin data set. Now, this communication link does not necessarily have to be present during the payment process. Instead, the sending (first) terminal can also delegate the splitting and/or merging and/or switching to the receiving (second) terminal.

The monitoring entity is adapted as a higher-level entity. Accordingly, the monitoring entity is not necessarily assembled in the layer or in the layer of the terminals (direct transaction layer). Preferably, the monitoring entity is provided for managing and checking masked electronic coin data sets and is arranged in an issuing layer, in which an issuing entity is also arranged, and/or a monitoring layer. It is conceivable that the monitoring entity additionally manages and verifies further transactions between terminals.

The monitoring entity is preferably a decentrally controlled database, Distributed Ledger Technology, DLT, in which the masked electronic coin data sets are registered with corresponding processing of the masked electronic coin data set. In a preferred embodiment, a validity status of the (masked) electronic coin data set can be derived therefrom. Preferably, the validity of the (masked) electronic coin data set is noted in and by the monitoring entity. The registration of the processing or processing steps may also concern the registration of check results and intermediate check results concerning the validity of an electronic coin data set, in particular the determination of check values and counter values of corresponding coin data sets. If a processing is final, this is displayed, for example, by corresponding marking or a derived overall marking. Final processing then determines whether an electronic coin data set is valid or invalid. In this way, exceeding a counter value or a check value may result in the coin data set being returned to the issuing entity or being declared as returned.

This database is further preferred to be a non-public database, but can also be implemented as a public database. This database makes it possible in a simple way to check coin data sets with regard to their validity and to prevent "double-spending", i.e. multiple issues, without registering or logging the payment transaction itself. In this context, DLT describes a technique for networked computers to come to an agreement on the order of determined transactions and that these transactions update data. It corresponds to a decentrally managed administrative system or database.

In a further embodiment, the database may be adapted as a public database.

Alternatively, the monitoring entity is a centrally managed database, for example in the form of a publicly accessible data storage or as a hybrid of a centralized and decentralized database.

Preferably, the at least one initial electronic coin data set is created exclusively by the issuing entity, wherein preferably the split electronic coin data sets, in particular electronic coin data subsets, can also be generated by a terminal. Preferably, creating and selecting a monetary amount also includes selecting a high entropy obfuscation amount. The issuing entity is a computing system, which is preferably remote from the first and/or second terminal. After the new electronic coin data set is created, the new electronic coin data set is masked in the issuing entity by applying, for example, the homomorphic one-way function to the new electronic coin data set to accordingly obtain a masked new electronic coin data set. Furthermore, additional information needed to register the creation of the masked new electronic coin data set in the remote monitoring entity is computed in the issuing entity. Preferably, this further information is a proof that the (masked) new electronic coin data set originates from the issuing entity, for example by signing the masked new electronic coin data set. In one embodiment, it may be provided that the issuing entity signs a masked electronic coin data set with its signature when generating the electronic coin data set. The signature of the issuing entity is stored in the monitoring entity for this purpose. The signature of the issuing entity is different from the generated signature of the first terminal.

Preferably, the issuing entity can deactivate an electronic coin data set in its possession (i.e., of which it knows the monetary amount and the obfuscation amount) by masking the masked electronic coin data set to be deactivated with, for example, the homomorphic one-way function and preparing a deactivate command for the monitoring entity. Part of the deactivate command is preferably, in addition to the masked electronic coin data set to be deactivated, proof that the deactivate step was initiated by the issuing entity, for example in the form of the signed masked electronic coin data set to be deactivated. As additional information, range checks for the masked electronic coin data set to be deactivated could be included in the deactivate command. The deactivate may be the result of a return. This is followed by registering the deactivation of the masked electronic coin data set in the remote monitoring entity. The deactivate command triggers the deactivate step.

The create and deactivate steps are preferably performed in secured locations, particularly not in the terminals. In a preferred embodiment, the create and deactivate steps are performed or triggered only by the issuing entity. Preferably, these steps take place in a secure location, for example, in a hardware and software architecture designed to process sensitive data material in insecure networks. Deactivating the corresponding masked electronic coin data set has the effect that the corresponding masked electronic coin data set is no longer available for further processing, in particular transactions. However, in one embodiment, it may be provided that the deactivated masked electronic coin data set remains in archival storage with the issuing entity. The fact that the deactivated masked electronic coin data set is no longer valid or returned may be indicated, for example, by means of a flag or other coding, or the deactivated masked electronic coin data set may be destroyed and/or deleted. The deactivated electronic coin data set is also physically removed from the terminal.

The method according to the invention enables various processing operations (modifications) for the electronic coin data sets and the corresponding masked electronic coin data sets. Each of the processing operations (in particular, creation, deactivation, splitting, merging, and switching) is thereby registered in the monitoring entity, where it is appended in an unmodifiable form to the list of previous processing operations for the respective masked electronic coin data set. The registration is independent of the payment process between the terminals in terms of both time and location (space). The processing operations "create" and "deactivate" (=return), which concern the existence of the monetary amount per se, i.e. mean the creation and annihilation up to the destruction of money, require an additional authorization, for example in the form of a signature, by the issuing entity in order to be registered (i.e. logged) in the monitoring entity. The remaining processing operations (splitting, merging, switching), of which splitting and merging can also be delegated from one terminal to another terminal, do not require authorization by the issuing entity or by the command initiator (=payer, e.g., the first terminal).

Processing in the direct transaction layer only concerns the ownership and/or the allocation of the coin data sets to terminals of the respective electronic coin data sets. A registration of the respective processing in the monitoring entity is realized, for example, by corresponding list entries in a database, which comprises a number of markings that have to be performed by the monitoring entity. A possible structure for a list entry comprises, for example, column(s) for a predecessor coin data set, column(s) for a successor coin data set, a signature column for the issuing entity, a signature column for the sending and/or receiving terminal, a signature column for coin distribution operations, and at least one marking column. A change in the status of the marking requires the approval of the monitoring entity and must then be stored in an unchangeable form. A change is final when and only when the required markings have been validated by the monitoring entity, i.e. changed from status "0" to status "1" after the corresponding check, for example. If a check fails or takes too long, it is instead changed from status "-" to status "0", for example. Other status values are conceivable and/or the status values mentioned here are interchangeable. Preferably, the validity of the respective (masked) electronic coin data sets is shown summarized from the status values of the markings, each in a column for each masked electronic coin data set involved in registering the processing.

In a further embodiment, at least two preferably three or even all of the aforementioned markings may also be replaced by a single marking that is set when all checks have been successfully completed. Furthermore, the two columns for predecessor data sets and successor data sets can be combined into one column each, in which all coin data sets are listed together. This would allow the management of more than two electronic coin data sets per field entry, e.g. a split into more than two coin data sets.

The checks by the monitoring entity to check that a processing is final are already described above and are in particular:

Are the masked electronic coin data sets of the predecessor column(s) valid?
Does monitoring yield the correct check value?
Are the range proofs for the masked electronic coin data sets successful?
Is the signature of the masked electronic coin data set a valid signature of the issuing entity?
Does the sending/receiving terminal (pseudonym) exceed a threshold for a maximum allowable monetary amount, especially per unit of time?
Preferred is also that a masked electronic coin data set is invalid when any of the following checks apply, i.e., when:
(1) the masked electronic coin data set is not registered in the monitoring entity;
(2) the last processing of the masked electronic coin data set indicates that there are predecessor coin data sets for it, but that last processing is not final; or
(3) the last processing of the masked electronic coin data set indicates that there are successor coin data sets for it and that last processing is final;
(4) the masked electronic coin data set is not the successor to a valid masked electronic data set unless it is signed by the issuing entity;
(5) the monetary amount of the masked electronic coin data set causes a threshold for a maximum allowable monetary amount, in particular per unit time, to be exceeded and the requested deanonymization is rejected by the corresponding terminal.

In one aspect, a payment system for exchanging monetary amounts is provided with a monitoring layer with a preferably decentrally controlled database, English Distributed Ledger Technology, DLT, in which masked electronic coin data sets are stored; and a direct transaction layer with at least two terminals in which the previously described method can be carried out; and/or an issuing entity for generating an electronic coin data set. In doing so, the issuing entity can prove that the masked generated electronic coin data set was generated by it, preferably the issuing entity can identify itself by signing and the monitoring entity can prove the issuing entity's signature.

In a preferred embodiment, the payment system comprises an issuing entity for generating an electronic coin data set. In doing so, the issuing entity can prove that the masked generated electronic coin data set was generated by it, preferably the issuing entity can identify itself by signing it, and the monitoring entity can prove the issuing entity's signature.

Preferably, the payment system is adapted to perform the above method and/or at least one of the embodiments.

Another aspect concerns a currency system comprising an issuing entity, a monitoring entity, a first terminal and a second terminal, wherein the issuing entity is adapted to create an electronic coin data set. The masked electronic coin data set is adapted to be detectably created by the issuing entity. The monitoring entity is adapted to perform a registration step as performed in the above method. Preferably, the terminals, i.e. at least the first and second terminals are adapted to perform one of the above method for transmitting.

In a preferred embodiment of the currency system, only the issuing entity is authorized to initially create and finally withdraw an electronic coin data set. Processing, for example the step of merging, splitting and/or switching, can be and preferably is performed by a terminal. The processing step of deactivating can preferably only be performed by the issuing entity. Thus, only the issuing entity would be authorized to invalidate the electronic coin data set and/or the masked electronic coin data set.

Preferably, the monitoring entity and the issuing entity are assembled in a server entity or are present as a computer program product on a server and/or a computer.

In this context, an electronic coin data set can exist in a variety of different manifestations and can thus be exchanged via different communication channels, hereinafter also referred to as interfaces. A very flexible exchange of electronic coin data sets is thus created.

The electronic coin data set can be represented, for example, in the form of a file. A file consists of related data stored on a data carrier, data storage or storage medium. Each file is initially a one-dimensional string of bits, which are normally interpreted as a group of byte blocks. An application program (application) or an operating system itself interprets this bit or byte sequence as, for example, a text, an image or a sound recording. The file format used in this process can vary, for example it can be a plain text file representing the electronic coin data set. In particular, the monetary amount and the blind signature are represented as a file.

For example, the electronic coin data set is a sequence of American Standard Code for Information Interchange, or ASCII, characters. In particular, the monetary amount and the blind signature are mapped as this sequence.

The electronic coin data set may also be converted from one form of representation to another form of representation in an apparatus. For example, the electronic coin data set can be received in the apparatus as a QR code and issued from the apparatus as a file or string.

These different forms of representation of one and the same electronic coin data set allow very flexible exchange between apparatuses of different technical equipment using different transmission media (air, paper, wired) and taking into account the technical design of an apparatus. The choice of the form of presentation of the electronic coin data sets is preferably made automatically, for example, on the basis of recognized or negotiated transmission media and apparatus components. Additionally, a user of an apparatus can also choose the representation form for exchanging (=transmitting) an electronic coin data set.

In a simple case, the data storage is an internal data storage of the terminal. This is where the electronic coin data sets are stored. Easy access to electronic coin data sets is thus ensured.

The data storage is in particular an external data storage, also called online storage. Thus, the apparatus has only one means of accessing the coin data sets stored externally and thus securely. In particular, if the apparatus is lost or malfunctions, the electronic coin data sets are not lost. Since ownership of the (unmasked) electronic coin data sets equals ownership of the monetary amount, money can be stored more securely by using external data storage.

If the monitoring entity is a remote monitoring entity, the apparatus preferably has an interface for communication using a common Internet communication protocol, such as TCP, IP, UDP, or HTTP. The transmission may include communication over the cellular network.

In a preferred embodiment, the terminal is arranged to perform the processing operations already described, in particular splitting, merging and switching, on an electronic coin data set. For this purpose, the computing unit is arranged to mask an electronic coin data set to be switched as the electronic coin data set and to associate it with a pseudonym that the monitoring entity needs as the masked electronic coin data set for registering the switching command or in the switching step. In this way, an electronic coin data set—as described above—can be switched.

Furthermore or alternatively, the computing unit is preferably arranged to mask an electronic coin data set divided into a number of coin data subsets and to associate it with a pseudonym to obtain a masked electronic coin data set and, if necessary, masked electronic coin data sets which can be registered in the monitoring entity. In this way, an electronic coin data set—as described above—can be split.

Moreover, or alternatively, the computing unit is preferably arranged to mask an electronic coin data set to be merged from a first and a second electronic coin data subset as the electronic coin data set and to associate it with a pseudonym to obtain a masked coin data set to be combined as the masked electronic coin data set to be registered in the monitoring entity. In this way, an electronic coin data set—as described above—can be merged.

In a preferred embodiment, the interface for issuing the at least one electronic coin data set is an electronic display unit of the apparatus, which is arranged for displaying the electronic coin data set and thereby (also) for issuing the electronic coin data set in visual form. As has already been described, the electronic coin data set is then interchangeable between apparatuses, for example in the form of an optoelectronically detectable code, an image, etc.

In a preferred embodiment, the interface for issuing the at least one electronic coin data set is a protocol interface for wirelessly sending the electronic coin data set to the other apparatus using a communication protocol for wireless communication. In particular, near-field communication is provided, for example by means of Bluetooth protocol or NFC protocol or IR protocol; alternatively or additionally, WLAN connections or mobile radio connections are conceivable. The electronic coin data set is then adapted and transmitted according to the protocol properties.

In a preferred embodiment, the interface for issuing the at least one electronic coin data set is a data interface for providing the electronic coin data set to the other apparatus by means of an application. In contrast to the protocol interface, the electronic coin data set is transmitted by means of an application. This application then transmits the coin data set in an appropriate file format. A file format specific to electronic coin data sets can be used. In its simplest form, the coin data set is transmitted as an ASCII string or text message, for example, SMS, MMS, instant messenger message (such as Threema or WhatsApp). In an alternative form, the coin data set is transmitted as an APDU string. A wallet application may also be provided. In this case, the exchanging apparatuses preferably ensure that an exchange is possible by means of the application, i.e. that both apparatuses have the application and are ready to exchange.

In a preferred embodiment, the apparatus further has an interface for receiving electronic coin data sets.

In a preferred embodiment, the interface for receiving the at least one electronic coin data set is an electronic capture module of the apparatus, arranged for capturing an electronic coin data set represented in a visual form. The capture module is then, for example, a camera or a barcode or QR code scanner.

In a preferred embodiment, the interface for receiving the at least one electronic coin data set is a protocol interface for wirelessly receiving the electronic coin data set from another apparatus using a communication protocol for wireless communication. In particular, near-field communication, for example using Bluetooth protocol or NFC protocol or IR protocol, is provided. Alternatively or additionally, WLAN connections or mobile radio connections are conceivable.

In a preferred embodiment, the interface for receiving the at least one electronic coin data set is a data interface for receiving the electronic coin data set from the other apparatus by means of an application. This application then receives the coin data set in an appropriate file format. A file format specific to coin data sets can be used. In its simplest form, the coin data set is transmitted as an ASCII string or as a text message, for example SMS, MMS, Threema or WhatsApp. In an alternative form, the coin data set is transmitted as an APDU string. Additionally, the transmission may be performed using a wallet application.

In a preferred embodiment, the interface for receiving the at least one electronic coin data set is also the interface for issuing the electronic coin data set, so that an interface is provided for both sending and receiving the coin data set.

Preferably, the part of the monetary amount to be received as an electronic coin data set is an electronic coin data subset of a previously split electronic coin data set. In this regard, the other apparatus (i.e., the apparatus of the user) can either independently contact the monitoring entity for splitting or use the apparatus as a trusted entity to communicate with the monitoring entity. In a preferred embodiment, the other apparatus would in this case send the apparatus an electronic coin data set requesting symmetric splitting into, for example, a first predefined electronic coin data subset and a second predefined electronic coin data subset.

In a preferred embodiment, the apparatus comprises at least one security element reader arranged to read a security element; a random number generator; and/or a communication interface to a vault module and/or banking institution with access to a bank account to be authorized.

In a preferred embodiment, the data storage is a shared data storage that can be accessed by at least one other apparatus, wherein each of the terminals has an application, wherein said application is arranged to communicate with the monitoring entity for registering electronic coin data subsets accordingly.

Thus, what is proposed here is a solution that issues digital money in the form of electronic coin data sets, which is modeled on the use of conventional (analog) banknotes and/or coins. The digital money is represented here by electronic coin data sets. As with (analog) banknotes, these electronic coin data sets will be usable for all forms of payments, including peer-to-peer payments and/or POS payments. Knowing all the components (especially monetary amount and obfuscation amount) of a valid electronic coin data set is equivalent to possessing (owning) the digital money. It is therefore advisable to keep these valid electronic coin data sets confidential, e.g., to store them in a security element/vault module of a terminal and process them there. In order to decide on the authenticity of an electronic coin data set and to prevent duplicate issues, masked electronic coin data sets are kept in the monitoring entity as a unique corresponding public representation of the electronic coin data set. Knowledge or possession of a masked electronic coin data set does not constitute possession of money. Rather, it is akin to checking the authenticity of the analog currency.

The monitoring entity also contains markings about processing performed and planned for the masked electronic coin data set. A status of the respective masked electronic coin data set is derived from the markings about the processing, indicating whether the corresponding (non-masked) electronic coin data set is valid, i.e., ready for payment. Therefore, a recipient of an electronic coin data set will first generate a masked electronic coin data set and have the monitoring entity authenticate the validity of the masked electronic coin data set. A major advantage of this solution according to the invention is that the digital money is distributed to terminals, merchants, banks and other users of the system, but no digital money or other metadata is stored at the monitoring entity—i.e. a common entity.

The proposed solution can be integrated with existing payment systems and infrastructures. In particular, there can be a combination of analog payment transactions with banknotes and coins and digital payment transactions according to the present solution. Thus, a payment transaction can be made with banknotes and/or coins, but the change or change back is available as an electronic coin data set. For the transaction, for example, ATMs with a corresponding configuration, in particular with a suitable communication interface, and/or mobile terminals can be provided. Furthermore, it is conceivable to exchange electronic coin data sets for banknotes or coins.

The steps of creating, switching, splitting, merging and deactivating (returning) listed above are each triggered by a corresponding create, switch, split, merge or deactivate command (return commands).

BRIEF SUMMARY OF THE FIGURES

In the following, the invention or further embodiments and advantages of the invention are explained in more detail based on figures, wherein the figures describe only embodiments of the invention. Identical components in the figures are given the same reference signs. The figures are not to be regarded as true to scale, and individual elements of the figures may be shown in exaggeratedly large or exaggeratedly simplified form.

It shows:

FIGS. 1a,b an embodiment example of a payment system according to the prior art;

FIG. 7 an embodiment example of a payment system, in particular a monitoring entity;

FIGURE DESCRIPTION

FIG. 1*a* and FIG. 1*b* show an embodiment example of a payment system according to the prior art and have already been briefly described in the introduction. Repeating, the terminal M7 wants to register the received coin data set $C_1$ as its coin data set $C_7$ at the entity 4 and the entity 4 detects that the coin data set $C_1$ is already invalid. As a result, entity 4 does not accept either the supposedly valid coin data set $C_1$ or the coin data set $C_7$ to be switched.

The problem can occur when, for example, an attacker M1 directly passes the coin data set $C_1$ to two participants M2 and M3. Once M2 registers the received coin data set in the monitoring entity 4, the coin data set $C_1$ becomes invalid. In the example shown, the coin data set $C_1$ becomes invalid as the sharing is communicated to the monitoring entity. An unsuspecting subscriber (terminal) M3 passes on the coin data set $C_1$ directly without having it registered. Only the terminal M7 breaks the direct transmission chain, wherein the monitoring entity 4 recognizes the invalidity from the coin data set $C_1$ and thus the double sharing is detected. A central bank (hereafter synonymous with an issuing entity of the electronic coin data sets) might now, on the one hand, want to limit the number of direct transmissions of coin data sets and, on the other hand, want to be able to trace where the attack took place in case of a detected attack.

Thus, in the prior art, an attack (double issuance of an electronic coin data set from M1) is detected relatively late and a large number of direct transmissions are performed in an unauthorized manner. Whether the attacker M1 is subsequently identifiable depends on implementation details of the overall system. For example, the terminals for the monitoring entity may be anonymous, pseudonymous, or identity-bound. In addition, the large number of transactions of an electronic coin data set and also its advancing lifetime increase the risk of tamper(s) with the electronic coin data set. It is thus desirable that when a certain lifetime or number of actions in total on/with the coin data set is exceeded, the coin data set expires.

Figure 13:
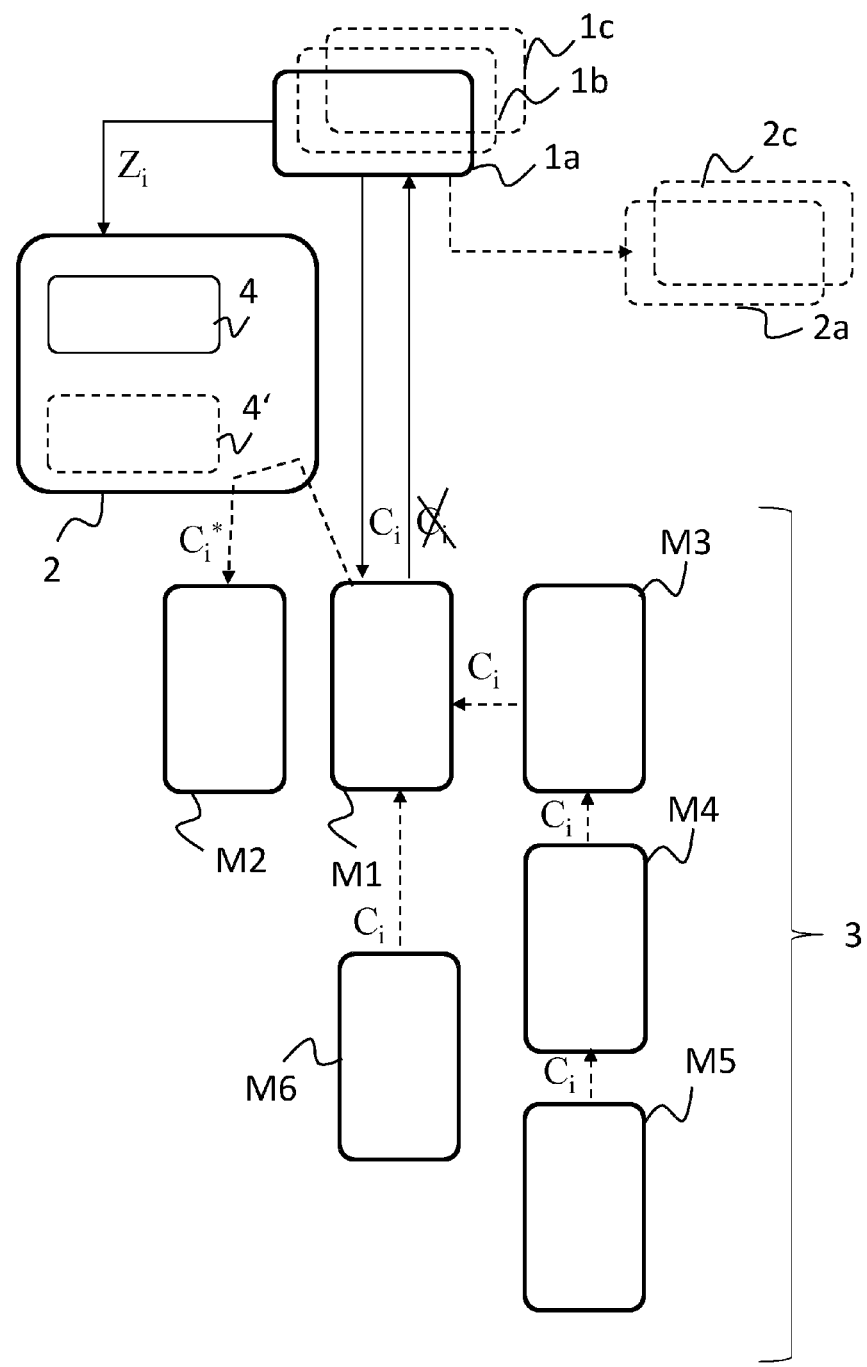
FIG. 13 a system according to the invention.

The overall system according to the invention comprises an issuing entity (central bank), at least one payment system and a plurality of participants represented as terminals Mx. The payment system comprises, for example, commercial banks and one (or more) central monitoring entity that performs the registration of the coin data sets and checks and logs the modifications to the coin data set. The overall system (system) is shown in FIG. 13.

Figure 2:
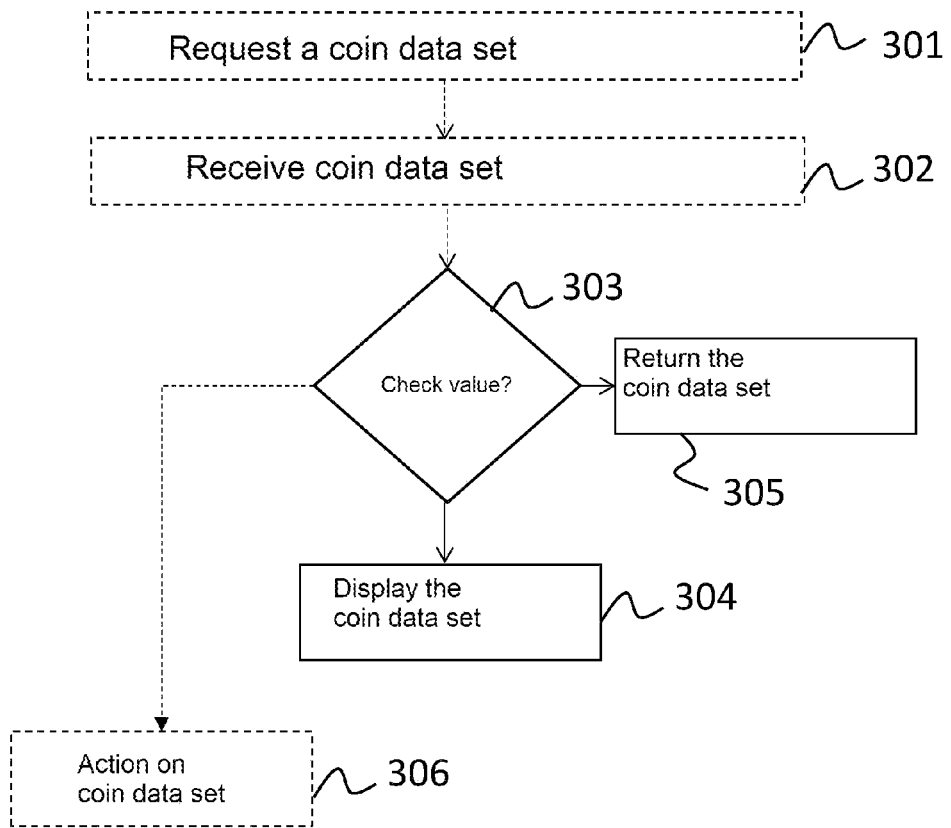
FIG. 2 an embodiment example of a process flow diagram of a method according to the invention.

FIG. 2 shows an embodiment of a process flow diagram of a method 300 according to the invention in a terminal. After an optional step 302 and a possibly upstream step 301, a coin data set is present at the terminal.

Thereby, an electronic coin data set is requested in the optional step 301—for example at an issuing entity 1—and received in the optional step 302 from a terminal, from the issuing entity or from a payment system. The step 302 could optionally also correspond to a send command from another terminal. Thus, another terminal sends a coin data set to the terminal with the send command and has—for example immediately or at some point—previously received the coin data set itself. Steps 301 and 302 may correspond to steps 101 and 102 of FIGS. 10 and 11, respectively.

In step 303, the terminal determines, based on a check value of the electronic coin data set, whether that electronic coin data set is to be displayed and/or returned, or used normally. The result of the check in step 303 may be that a step 304, 305 is performed for the coin data set or that—now or later—any action (splitting, merging, switching, transmitting, redeeming, changing) may be (is) performed on the coin data set in step 306. In step 304, the checked coin data set is displayed by the terminal at the payment system. In step 305, the checked coin data set is returned, for example directly or indirectly to the central issuing entity or to a monitoring entity or to the payment system, which in turn return the coin data set (to the central issuing entity). The determining (or checking) 303 is performed before a use of the coin data set, in particular at least once for each coin data set received and/or before each use. The possible process flow 300 may comprise only one of or both of steps 304, 305. Accordingly, only one or both of steps 304, 305 are checked to be performed in step 303.

Displaying in step 304 may be understood as reporting the coin data set to the monitoring entity (for the terminal). Thus, after a certain number of direct transfers of the coin data set, automatic registration of the coin data set in the payment system occurs, thus registration is systematically enforced. It should be noted that the terminal can be anonymous, pseudonymous or identity-known to the monitoring entity when registering. For the checked coin data set, the displaying terminal is assigned as a new owner, preferably—as explained in more detail later—a modified coin data set for the displaying terminal is created from the checked coin data set.

In embodiments of the system, a return to the central bank is not necessary and may be nonsensical. This is especially true when an issued coin data set in the payment system becomes modified coin data sets rather quickly one after the other. Then the coin data set only needs to be displayed (reported) again in the payment system when a number of direct transfers between terminals is exceeded, so that this coin data set is registered in the payment system (for the terminal). For example, the coin data set will be modified, such as switched, after the display step 304. The coin data set to be switched is then considered to be taken back. Thus, a portion of the normal actions 306 that are permitted when the check result is positive may also serve as the display step 304.

In the electronic coin data set, a check value is presently maintained as a data element. This check value is incremented each time this coin data set is transmitted directly between terminals. In the payment system, a counter value can also be maintained or determined that incorporates the check value, for example as the sum of the previous (registered) counter value and the check value, to determine whether the coin data set is to be returned. Each action on the coin data set increments this counter value. Different action types weight the counter value differently, so that, for example, a direct transfer of the coin data set has a higher weight than a modification (splitting, combining). In this way, the lifetime and the actions it has in a coin data set are evaluated and criteria for its return are defined according to the actions it has. The check value and also the counter value represent the life cycle of the coin data set, based on which a decision is then made about its return.

Figure 3:
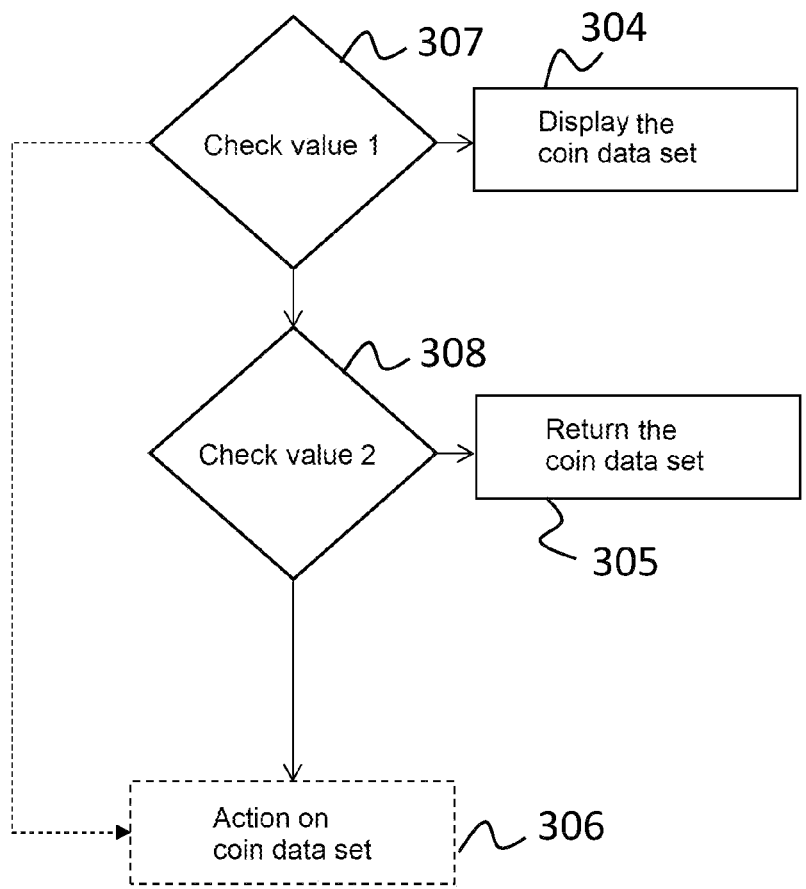
FIG. 3 an embodiment example of a further development of the process flow diagram shown in FIG. 2.

FIG. 3 shows an embodiment example 330 of a further development of the process flow diagram shown in FIG. 2. In FIG. 3, step 303 of the method of FIG. 2 is shown in more detail with two sub-steps 307, 308. For this purpose, a coin data set has two check values. For a coin data set, i.e., for example, after the receive step 302 or the send command, it is determined 307 based on a first check value of the coin data set whether the coin data set must be displayed in the payment system, i.e., whether the coin data set is reported to force registration in the payment system. In particular, in step 307, the number of direct transfers is checked and, if a threshold value is exceeded, display to the payment system is forced in accordance with step 304.

A second check value in the coin data set is used in step 308 to determine whether to return the coin data set to the central issuing entity. The second check value is action invariant and continues unchanged during actions of the coin data set. For example, this second check value is a return date. This return date is integrated as a data element into the coin data set by the issuing entity during the creation of the coin data set. If the check in step 308 detects that the return date has been reached or exceeded, the coin data set is returned to the issuing entity by the terminal.

The second check value may be an issuance date, for example. This issuance date is integrated as a data element into the coin data set by the issuing entity during the generation of the coin data set. If it is detected during the check in step 308 that the issuance date is before a predefined reference issuance date, for example a fixed period of time, such as a year or a month, the coin data set is returned by the terminal to the issuing entity.

The second check value may be an identification value, for example. The identification value is not coin data set specific and only allows to infer a group of coin data sets. This identification value is integrated as a data element into the coin data set by the issuing entity during the generation of the coin data set. If the check in step 308 detects that the identification value matches a predefined identification value, the coin data set is returned by the terminal to the issuing entity.

The second check value may be, for example, a registration date of the electronic coin data set, i.e., a date when the coin data set was last registered in the payment system. This registration date is integrated into the coin data set as a data element when the coin data set is registered in the payment system. If the check in step 308 detects that the registration date is before a fixed period of time, for example one year or one month before the current date, the coin data set is returned by the terminal to the issuing entity.

Thus, the terminal knows the threshold value(s) for the second check value for the check in step 308. If the check in step 308 indicates that there is no need to return the coin data set, an action is initiated on the coin data set in step 308, or normal use with the coin data set is permitted.

Figure 4:
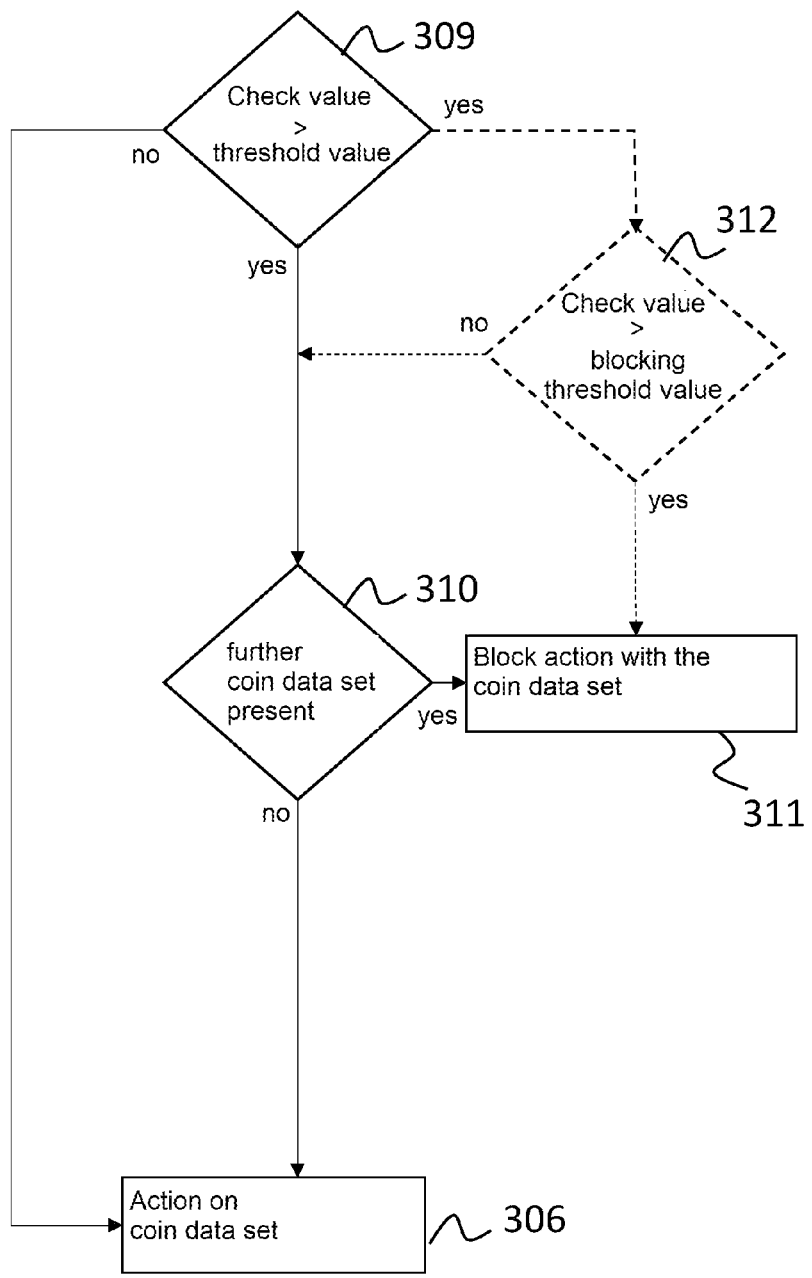
FIG. 4 an embodiment of a further development of the process flow diagram shown in FIG. 2.

In FIG. 4, another embodiment example 340 of a further development of the process flow diagram shown in FIG. 2 is shown. FIG. 3 also shows in more detail the step 303 of the method of FIG. 2. The methods of FIGS. 3 and 4 can be combined with each other. In FIG. 4, in step 309, a check value (for example, the first check value and/or the second check value of FIG. 3) is compared with a predefined threshold value.

If the check value is less than the threshold value, in step 306 the (planned) action is performed on/with the coin data set.

If the check value is greater than (the threshold value) or equal to the threshold value, a check is made in step 310 to see if another coin data set is present in the terminal. If another coin data set is present in the terminal, for example in a data storage to which the terminal has access, then the (checked) coin data set is blocked in step 311.

Blocking in this context means, in particular, that the coin data set is not passed on to another terminal. For this purpose, the coin data set is transferred to a secure data storage, for example, to which only a return process or a display process of the terminal has access. The coin data set can no longer be used for actions when blocked. It must be returned to the issuing entity or displayed to the payment system (mandatory registration). The further (other) coin data set is a coin data set of the payment system and generated by the same issuing entity. The checking in step 310 can be performed as a function of a monetary amount, such that the monetary amount of all available coin data sets must be less than the amount to be paid (i.e., the monetary amount of the coin data set to be checked). This step 310 allows, for example, payment operations to be performed even though the coin data set already meets the criteria for a return or display, to make the method user-friendly and suitable for everyday use.

In an alternative embodiment of the method 340 of FIG. 4, shown in dashed lines, after detecting that the check value is greater than or equal to the threshold value (step 309), a second check is performed at step 312 comparing the check value to a blocking threshold value. In any case, if the check value is greater than or equal to the blocking threshold value, the coin data set is blocked in step 311. This blocking occurs regardless of the presence of other (different) coin data sets (step 310). The method 340 then uses two different threshold values for the same check value (threshold value is not equal to blocking threshold value). An action with the coin data set is only possible when the threshold value is exceeded when no other (further) coin data set is available in the terminal. If the check value also exceeds a blocking threshold value (second threshold value), an action with the coin data set, but in particular the direct transmission of the coin data set, is blocked in order to guarantee a minimum level of security. The blocking threshold value can be a multiple of the threshold value in order not to block the terminal prematurely. For example, the threshold value of the check value is a number of 10 or 5 or 3 direct transmissions of the coin data set. The blocking threshold value is, for example, 30 or 15 or 10 direct transmissions of the coin data set.

Figure 5:
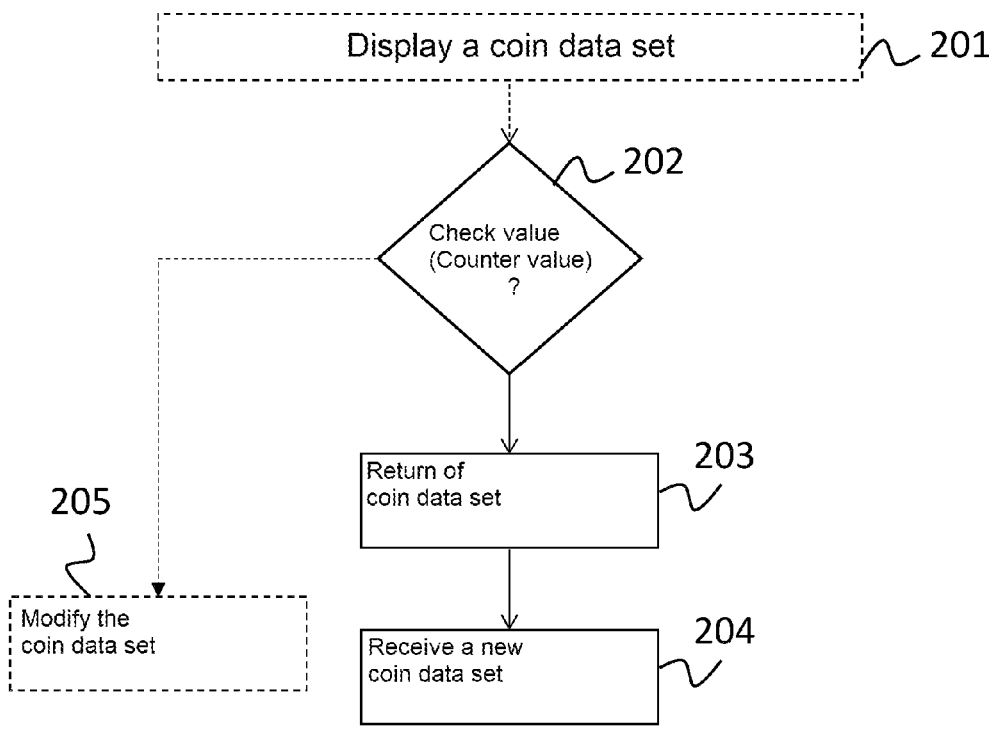
FIG. 5 an embodiment example of a process flow diagram of a method according to the invention.

In FIG. 5, an embodiment example of a process flow diagram of a method 200 according to the invention in a payment system is shown. Here, a coin data set 201 is displayed by a terminal in the payment system. The displaying is performed, for example, by a method 300, 330, 340 shown in FIG. 2 to FIG. 4. In step 202, the payment system, in particular the monitoring entity of the payment system, checks a check value. For this purpose, the check value has been provided to the payment system. Alternatively, a counter value in the payment system is checked using the check value. Alternatively, the display of a coin data set without transmitting the check value, in particular when the displaying across the payment system means a check value has a certain minimum value.

In one embodiment of the method, the payment system also stores the check value (second check value, see FIG. 3). In the payment system, a check for time, for example, when the check value is a date value, or a check for a threshold value, when the check value is an identification value, is then performed in step 202. The check in step 202 can be based on lookup tables, LUT, from the issuing entity, or a time lapse.

The result of the check results in either a return of the coin data set 203 to the issuing entity or, alternatively, a modification of the coin data set by the payment system. The return in step 203 may also be a request to the displaying terminal to return the coin data set to the issuing entity. Alternatively, the payment system requests the return by the terminal. In step 204, as a result of the return, a new coin data set having an identical monetary amount to the returned coin data set is then generated and provided by the issuing entity. Alternatively, the monetary amount of the returned coin data set is credited as book money to an account of the subscriber (terminal owner).

For example, a counter value is determined based on the first check value $p_{i1}$. Different action types can be weighted differently. For example, the direct forwarding action type is weighted by a constant A. The constant A may be highest because this action type represents the greatest uncertainty for payment system 2. Indirect forwarding (i.e., forwarding that are backed up with a switch command), for example, are weighted by a constant B, wherein A is greater than B. Other action types (splitting, merging, etc.) are weighted with a low weight C, since the uncertainty for the payment system is the lowest. In particular, the criterion of weight for an action type is the security that this action type brings, wherein the weight is inversely proportional to the security.

When the action is a split, an increased value is adopted for all split coin data sets after checking the check value or counter value. When the action is a merging, a new check value is determined considering all old check values.

Figure 6:
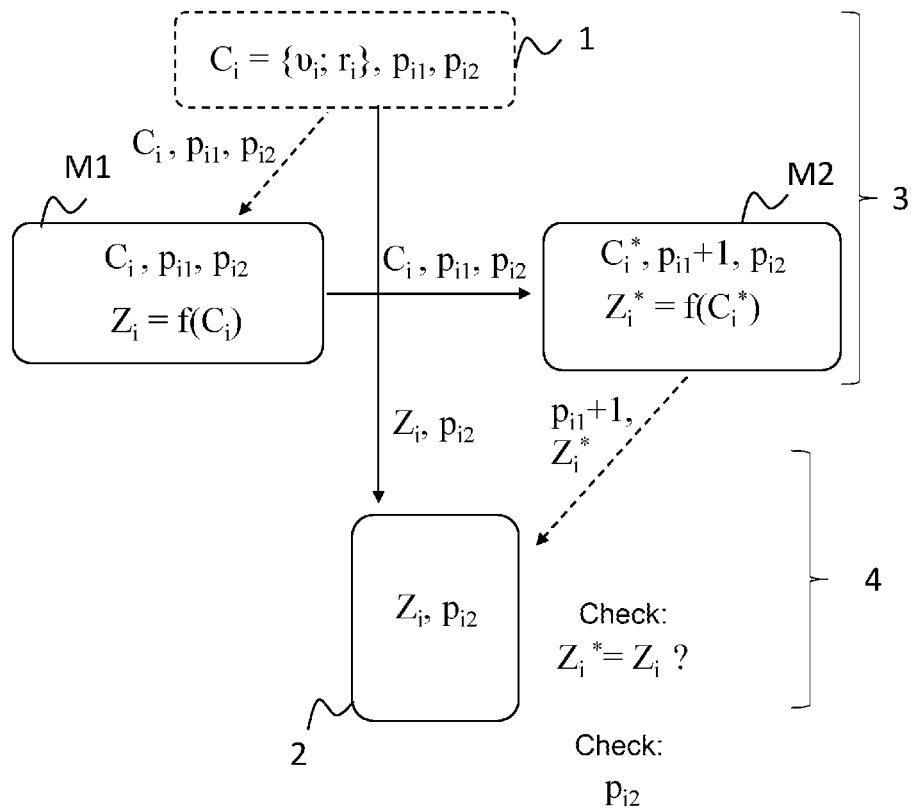
FIG. 6 an embodiment example of a system according to the invention.

FIG. 6 shows an embodiment example of a payment system with terminals M1 and M2. The terminals M1 and M2 may be apparatuses.

In this case, an electronic coin data set $C_i$ is generated in an issuing entity 1, for example a central bank. A masked electronic coin data set $Z_i$, is generated for the electronic coin data set $C_i$, provided with an obfuscation amount and registered in an "obfuscated electronic data set ledger" as a payment system 2. In the context of the present invention, a ledger is understood to be a list, a directory, preferably a database structure. The electronic coin data set $C_i$ is issued to a first terminal M1.

For example, a true random number has been generated as an obfuscation amount n for this purpose. The obfuscation amount $r_i$ is associated with a monetary amount $v_i$. The i-th electronic coin data set $C_i$ is also assigned a first check value $p_{i1}$ described above and a second check value $p_{i2}$. Accordingly, an i-th electronic coin data set according to the invention could be:

$$C_i=\{v_i;r_i\},p_{i1},p_{i2} \quad (1)$$

A valid electronic coin data set can be used for payment. The owner of the two values $v_i$ and $r_i$ is therefore in possession of the digital money. However, the digital money is defined by a pair consisting of a valid electronic coin data set and a corresponding masked electronic coin data set $Z_i$. A masked electronic coin data set $Z_i$ is obtained by applying a one-way function f ($C_i$) according to equation (2):

$$Z_i=f(C_i) \quad (2)$$

For example, the one-way function $f(C_i)$ is homomorphic. This function f ($C_i$) is public, i.e., any system participant can invoke and use this function. This function f ($C_i$) is defined according to equation (3) or equation (3a), for example:

$$Z_i=v_iH+r_iG \quad (3)$$

$$Z_i=r_iG \quad (3a)$$

wherein H and G are generator points of a group G in which the discrete logarithm problem is hard, with the generators G and H for which the discrete logarithm of the other basis is unknown. For example, G (equation (3), (3a)) as well as H (equation (3)) are each a generator point of an elliptic curve encryption, ECC,—that is, private keys of the ECC. In the case of equation (3), these generator points G and H must be chosen in such a way that the connection between G and H is not publicly known, so that if:

$$G=n\,H \quad (4)$$

the linkage n must be practically undetectable to prevent the monetary amount $v_i$ from being manipulated and still a valid $Z_i$ could be calculated. Equation (3) is a "Pederson commitment for ECC" that ensures that the monetary amount $v_i$ can be conceded, i.e., "committed," to a monitoring entity 2 without revealing it to the monitoring entity 2. Therefore, only the masked coin data set $Z_i$ is sent (disclosed) to the public and remote monitoring entity 2.

Even when in the present example an encryption based on elliptic curves is or will be described, another cryptographic method would also be conceivable, which is based on a discrete logarithmic method and is based on equation (3a).

When equation (3a) is applied, a one-way function is applied to only a portion of the coin data set C, in this case the obfuscation amount r, this partially masked coin data set may also be referred to as R.

Equation (3), through the entropy of the obfuscation amount $r_i$, allows a cryptographically strong $Z_i$ to be obtained even when the range of values for monetary amounts $v_i$ is small. Thus, a simple brute-force attack by merely estimating monetary amounts $v_i$ is practically impossible.

Equations (3) and (3a) use one-way functions, meaning that computing $Z_i$ from $C_i$ is easy because an efficient algorithm exists, whereas computing $C_i$ starting from $Z_i$ is very hard because no algorithm solvable in polynomial time exists.

Moreover, equation (3) is homomorphic for addition and subtraction, that is:

$$Z_i+Z_j=(v_iH+r_iG)+(v_jH+r_jG)=(v_i+v_j)H+(r_i+r_j)G \quad (5).$$

Thus, addition operations and subtraction operations can be performed both in the direct transaction layer 3 and in parallel in the monitoring layer 4 without the monitoring layer 4 having knowledge of the electronic coin data sets $C_i$. The homomorphic property of equation (3) allows monitoring of valid and invalid electronic coin data sets $C_i$ based solely on the masked coin data sets $Z_i$ and to ensure that no new monetary amount $v_j$ has been created.

Through this homomorphic property, the coin data set $C_i$ can be divided according to equation (1) into:

$$C_i=C_j+C_k=\{v_j;r_j\}+\{v_k;r_k\} \quad (6)$$

where:

$$v_i=v_j+v_k \quad (7)$$

$$r_i=r_j+r_k \quad (8)$$

For the corresponding masked coin data sets:

$$Z_i = Z_j + Z_k \quad (9)$$

Figure 8:
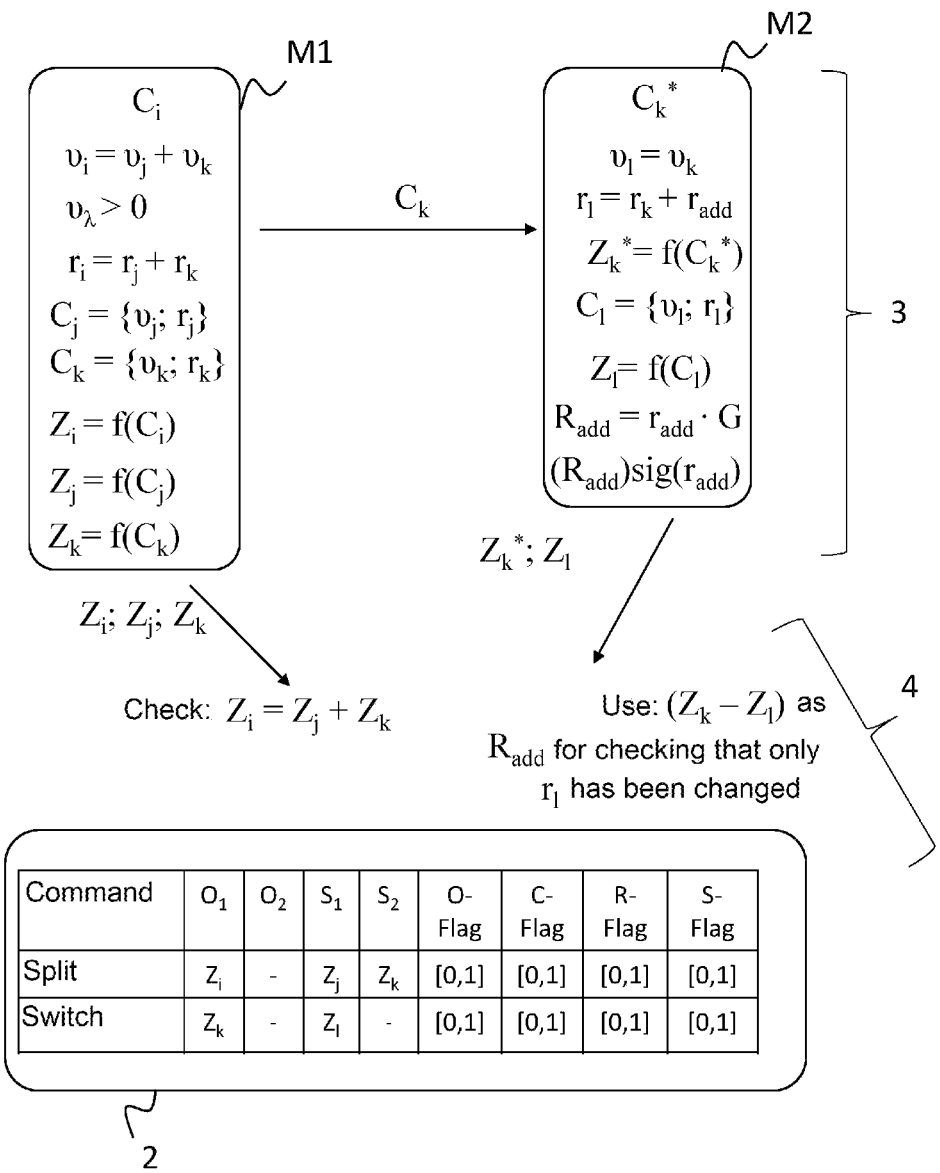
FIG. 8 an embodiment example of a system according to the invention for splitting and switching electronic coin data sets.

Equation (9) can be used, for example, to easily check a processing step of a split coin data set—for example, according to FIG. 8—without the monitoring entity 2 having knowledge of $C_i$, $C_j$, $C_k$. In particular, the condition of equation (9) is checked to validate split coin data sets $C_j$ and $C_k$ and invalidate coin data set $C_i$. Such splitting of an electronic coin data set $C_i$ is shown in FIG. 8.

Figure 9:
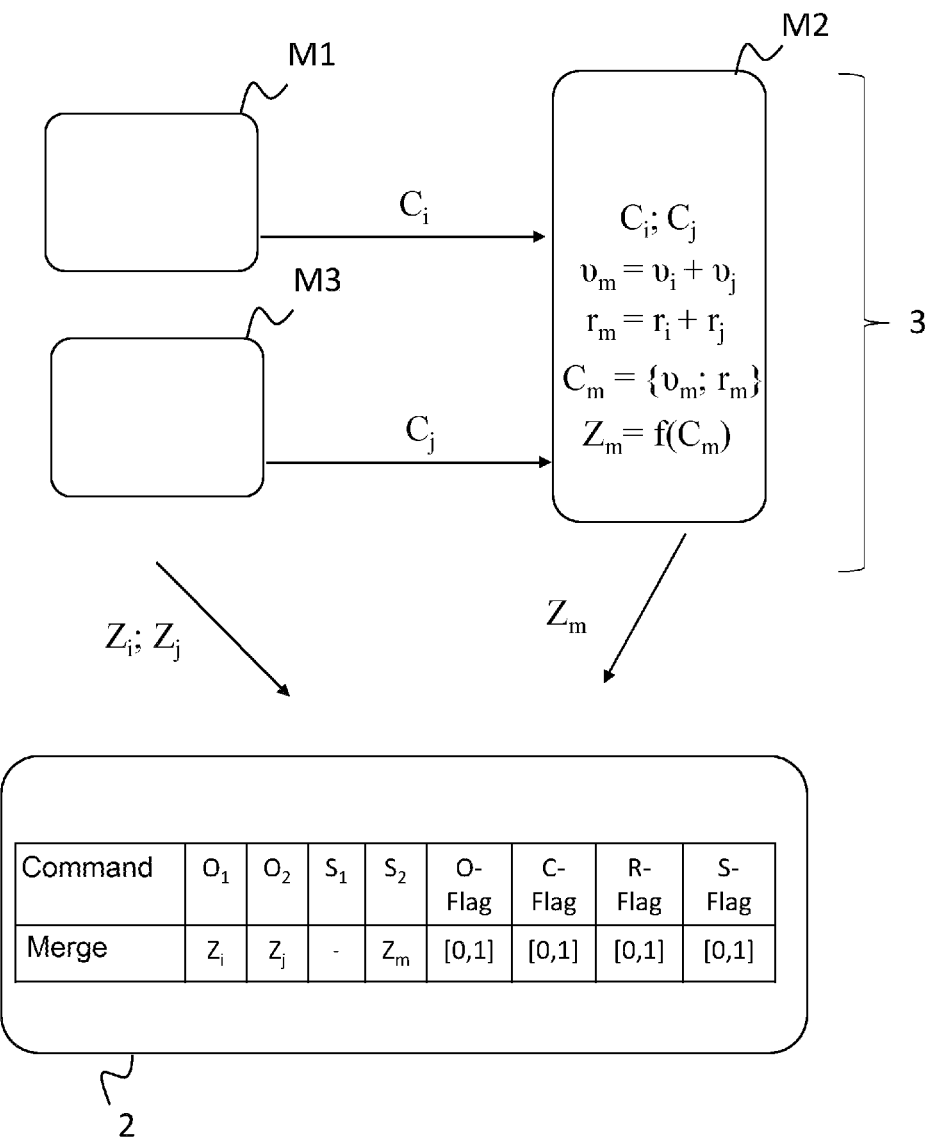
FIG. 9 an embodiment example of a payment system according to the invention for merging electronic coin data sets.

In the same way, electronic coin data sets can also be assembled (merged), see FIG. 9 and the explanations.

In addition, it is important to check whether (not allowed) negative monetary amounts are registered. An owner of an electronic coin data set $C_i$ must be able to prove to the monitoring entity 2 that all monetary amounts $v_i$ in a processing operation are within a value range of $[0, \ldots, n]$ without informing the monitoring entity 2 about the monetary amounts $v_i$. These range proofs are also called "range proofs". Ring signatures (English ring signature) are preferably used as range proofs. For the present embodiment example, both the monetary amount $v$ and the obfuscation amount $r$ of an electronic coin data set C are resolved in bit representation. It holds:

$$v_i = \Sigma a_j \cdot 2^j \text{ for } 0 \leq j < n \text{ and } a_j \in \{0;1\} \quad (9a)$$

as well as $$r_j \Sigma = r_j \cdot 2^j \text{ for } 0 \leq j < n \text{ (and optionally } r_j \in \{0;1\}) \quad (9b)$$

For each bit, preferably a ring signature with $$C_{ij} = a_j H + r_j G \quad (9c)$$

and $$C_{ij} - a_j H \quad (9d)$$

is preferably performed for each bit, wherein in one embodiment it can be provided to perform a ring signature only for certain bits.

In FIG. 6, an electronic coin data set $C_i$ is generated by the issuing entity 1 and made available to the first terminal M1 with its first check value $p_{i1}$ and its second check value $p_{2i}$. The first check value $p_{i1}$ is incremented with each direct transfer between terminals Mx and is initially "0" when generated. The second check value $p_{i2}$ is action invariant and is either an issuance date, a return date, or a group ID of the coin data set $C_i$. Alternatively, the second check value $p_{i2}$ is a registration date that is updated by the payment system 2 with each registration.

In FIG. 6, the electronic coin data set $C_i$ is calculated by the issuing entity 1 using equation (3) or equation (3a) a masked electronic coin data set $Z_i$ is calculated by the issuing entity 1 and this is registered together with at least the second check value $p_{i2}$ in the payment system 2 or the monitoring entity 4. The first check value $p_{i1}$ can also be registered (not shown). Subsequently, the first terminal M1 transmits the electronic coin data set $C_i$ and the check values $p_{i1}$, $p_{i2}$ to a second terminal M2 or performs modifications (switching, merging, splitting). The transmission takes place wirelessly via WLAN, NFC or Bluetooth, for example. The transmission may be additionally secured by cryptographic encryption methods, for example by negotiating a session key or applying a PKI infrastructure.

In the second terminal M2, the transmitted electronic coin data set $C_i$ is received as $C_i^*$. With the receipt of the electronic coin data set $C_i^*$, the second terminal M2 is in possession of the digital money represented by the electronic coin data set $C_i^*$. With direct transmission, the check value $p_{i1}$ is incremented by the sending terminal M1 (not shown) or the receiving terminal M2. The sending terminal M1 (not shown) or the receiving terminal M2 now checks the check value $p_{i1}$ or the two check values $p_{i1}$, $p_{i2}$, respectively, according to the embodiments of FIG. 2 to FIG. 4. According to the result of the check, the coin data set $C_i$ is displayed or returned or is available in the terminal M2 for further action.

When both terminals M1, M2 trust each other and the check values are below the defined threshold values or check criteria, no further steps are necessary to terminate the method. However, the terminal M2 does not know whether the electronic coin data set $C_i^*$ is actually valid. Moreover, the terminal M1 could still transmit the electronic coin data set $C_i$ to a third terminal (not shown). To prevent this, further preferred steps are provided in the method.

To check the validity of the received electronic coin data set $C_i^*$, the masked transmitted electronic coin data set $Z_i^*$ is calculated in the second terminal M2 using the—public— one-way function from equation (3) or equation (3a). The masked transmitted electronic coin data set $Z_i^*$ is then transmitted to and searched for by the monitoring entity 2. If there is a match with a registered and valid masked electronic coin data set, the validity of the received coin data set $C_i^*$ is displayed to the second terminal M2 and it is valid that the received electronic coin data set $C_i^*$ is equal to the registered electronic coin data set $C_i$. In one embodiment, the validity check can be used to detect that the received electronic coin data set $C_i^*$ is still valid, i.e. that it has not already been used by another processing step or in another transaction and/or has been subject to further modification.

Preferably, a switching of the received electronic coin data set takes place thereafter.

It is valid for the method according to the invention that the sole knowledge of a masked electronic coin data set $Z_i$ does not authorize to issue the digital money. However, the sole knowledge of the electronic coin data set $C_i$ entitles to pay, i.e. to perform a transaction successfully, especially when the coin data set $C_i$ is valid. There is a one-to-one relationship between the electronic coin data sets $C_i$ and the corresponding masked electronic coin data sets $Z_i$. The masked electronic coin data sets $Z_i$ are registered in the monitoring entity 4 of the payment system 2, for example a public decentralized database. This registration first makes it possible to check the validity of the electronic coin data set, for example whether new monetary amounts have been created (illegally).

A main distinguishing feature compared to conventional solutions is that the masked electronic coin data sets $Z_i$ are stored in a monitoring entity 4 and all processing on the electronic coin data set Z is registered there, whereas the actual transmission of the digital money takes place in a (secret, i.e. not known to the public) direct transaction layer 3.

To prevent multiple issuance or to ensure more flexible transmission, the electronic coin data sets can now be processed in the method according to the invention. Table 1 below lists the individual operations, wherein the specified command also executes a corresponding processing step:

TABLE 1

Number of operations that can be performed per processing of a coin data set in the terminal or issuing entity:

| Command or step | Create signature | Create random number | Create masking | Create range proof |
|---|---|---|---|---|
| Generate | 1 | 1 | 1 | 0 or 1 |
| Return | 1 | 0 | 1 | 0 or 1 |
| Split | 1 | 1 | 3 | 0 or 1 |
| Merge | 1 | 0 | 3 | 1 |
| Switch | 1 | 1 | 2 | 1 |

Other operations not listed in Table 1 may be required, for example, changing the currency or redeeming the monetary amount on an account. Instead of the listed implementation, other implementations that imply other operations are also conceivable. Table 1 shows that for each coin data set, each of the processing operations "Create", "Return", "Split", "Merge" and "Switch" can provide different operations "Create signature"; "Create random number"; "Create masking"; "Range check", wherein each of the processing operation is registered in the monitoring entity 4, where it is appended in invariant form to a list of previous processing operations for masked electronic coin data sets $Z_i$. The operations of the "create" and "return" processing operations of an electronic coin data set are performed only at secure locations and/or only by selected entities, such as issuing entity 1, while the operations of all other processing operations can be performed on terminals M1 through M3.

The number of operations for each processing is indicated by "0", "1" or "2" in Table 1. The number "0" here shows that the terminal or issuing entity 1 does not have to perform this operation for this processing of the electronic coin data set. The number "1" shows that the terminal or issuing entity 1 must be able to perform this operation once for this processing of the electronic coin data set. The number "2" shows that the terminal or the issuing entity 1 must be able to perform this operation twice for this processing of the electronic coin data set.

In principle, in one embodiment, it can also be provided that an range check is also performed by the issuing entity 1 when generating and/or deleting.

Table 2 below lists the operations required for the monitoring entity 4 for the individual processing operations:

TABLE 2

Number of operations that can be performed per processing of a coin data set in the monitoring entity:

| Command or step | Check signature of issuer | Check signature of terminal | Check validity of the masked electronic coin data set | Track range proof | Track homomorphic properties of the masked electronic coin data sets; i.e. add or subtract |
|---|---|---|---|---|---|
| Generate | 1 | 0 | 0 | 0 or 1 | 0 |
| Return | 1 | 0 | 1 | 0 or 1 | 0 |
| Split | 0 | 1 | 1 | 2 or more | 1 |
| Merge | 0 | 1 | 2 or more | 1 | 1 |
| Switch | 0 | 1 | 1 | 1 | 0 |

Other operations not listed in Table 2 may be required. Instead of the listed implementation, other implementations are conceivable that imply other operations. All operations of Table 2 can be performed in the monitoring entity 2, which is a trusted entity, for example a decentralized server, in particular a distributed trusted server, that ensures sufficient integrity of the electronic coin data sets.

Table 3 shows the preferred components to be installed for the system participants in the payment system of FIG. 1:

TABLE 3

| Preferred units in system components | | | |
|---|---|---|---|
| Command or step | Issuing entity | Terminal | Monitoring entity |
| Random number generator (high security) | Yes | — | — |
| Random generator (deterministic) | — | Yes | — |
| PKI for signing | Yes | Yes | — |
| PKI for signature check | — | (Yes) | Yes |
| Read access on DLT | Yes | Yes | Yes |
| Write access on DLT | Yes | Yes | Yes |
| Return of electronic coin data set | Yes | Yes | — |
| Transport encryption | Yes | Yes | — |
| Secure storage | (Yes) | Yes | —/Yes |
| Masking unit | Yes | Yes | — |
| Range proof | — | Yes | — |
| Check range proof | — | — | Yes |
| DLT software | — | — | Yes |

Table 3 shows an overview of the preferred components to be used in each system participant, i.e., the issuing entity 1, a terminal M1 and the monitoring entity 2. The terminal M1 can be used as a wallet for electronic coin data sets $C_i$ (with their check value $p_{i1}$ $p_{i2}$) i.e. adapted as an electronic wallet, i.e., a data storage of the terminal M1, in which a plurality of coin data sets $C_i$ may be stored, and may be implemented, for example, in the form of an application on a smartphone or IT system of a merchant, commercial bank, or other market participant, and send or receive an electronic coin data set. Thus, the components are implemented as software in the terminal as shown in Table 3. It is assumed that the monitoring entity 2 is based on a DLT and operated by a set of trusted market participants.

FIG. 7 shows an embodiment example of a payment system 2 (or a monitoring entity 4) of FIG. 6. In FIG. 7, an exemplary database is shown in the form of a table in which the masked electronic coin data sets $Z_i$ and, if applicable, their processing are registered. The monitoring entity 2 is preferably assembled locally remote from the terminals M1 to M3 and is housed, for example, in a server architecture.

Each processing operation for a processing (create, return, symmetric or asymmetric split, merge and switch) is thereby registered in the monitoring entity 4 and appended there in unchangeable form to a list of previous processing operations for masked electronic coin data sets $Z_i$. The individual operations or their check results, i.e. quasi the intermediate results of a processing operation, are recorded in the monitoring entity 4.

The processing operations "create" and "return", which concern the existence of the monetary amount $v_i$ per se, i.e. imply the creation and destruction of money, require additional authorization by the issuing entity 1 to be registered (i.e. logged) in the monitoring entity 4. The remaining processing operations (splitting, merging, switching) do not require authorization by issuing entity 1 or by the command initiator (=payer, e.g. the first terminal M1).

A registration of the respective processing in the monitoring entity 4 is realized, for example, by corresponding list entries in the database according to FIG. 7. Each list entry has further markings 25 to 28 documenting the intermediate results of the respective processing to be performed by the monitoring entity 4. Preferably, the markings 25 to 28 are used as an aid and are discarded by the monitoring entity after completion of the commands. What remains are markings 29 through 32 about the validity of the (masked) electronic coin data sets from columns 22a, 22b, 23a and/or 23b. These markings are in state "-" when a processing command is received, for example, and are set to state "1" when all checks have been successfully completed and are set to state "0" when at least one check has failed. A possible structure for a list entry of a coin data set comprises, for example, two columns 22a, 22b for a predecessor coin data set (O1, O2), two columns 23a, 23b for a successor coin data set (S1, S2), a signature column 24 for signatures of issuing entity(ies) 1 and signatures of terminals M, and four marking columns 25 to 28. Each of the entries in columns 25 to 28 has three alternative states "-", "1" or "0". Column 25 (O flag) displays whether a validity check with respect to an electronic coin data set in column 23a/b was successful, wherein state "1" indicates that a validity check revealed that the electronic coin data set of column 23a/b is valid and state "0" indicates that a validity check revealed that the electronic coin data set of column 23a/b is invalid and state "-" indicates that a validity check has not yet been completed. Column 26 (C flag) displays whether the calculation of the masked electronic coin data set was successful, wherein state "1" indicates that a calculation was successful and state "0" indicates that calculation was unsuccessful and the state "-" indicates that a validity check is not yet complete.

For example, the calculation to be performed in column 26 for masked coin data sets according to equation (3) is:

$$(Z_{O1}+Z_{O2})-(Z_{S1}+Z_{S2})==0 \quad (10)$$

Column 27 (R flag) indicates whether a check of range proofs or a range proof was successful, wherein state "1" indicates that a validity check revealed that the range proofs or the range proof are or is traceable, and state "0" indicates that a validity check revealed that the range proofs or the range proof are not or is not traceable, and state "-" indicates that a validity check has not yet been completed, was successful.

Column 28 (S flag) indicates whether a signature of the electronic coin data set matches the signature of column 24, wherein state "1" indicates that a validity check revealed that the signature could be identified as that of issuing entity 1 and state "0" indicates that a validity check revealed that the signature could not be identified as that of the issuing entity and state "-" indicates that a validity check is not yet completed.

A change in the state of any of the markings (also referred to as a "flag") requires approval by the monitoring entity 4 and must then be stored immutably in the monitoring entity 4. A processing is final when and only when the required markings 25 to 28 have been validated by the monitoring entity 4, i.e. changed from state "0" to state "1" or state "1" after the appropriate check.

To detect whether a masked electronic coin data set Z is valid, the monitoring entity 4 searches for the last change that concerns the masked electronic coin data set Z. It is true that the masked electronic coin data set Z is valid if and only if the masked electronic coin data set Z is listed for its last processing in one of the successor columns 23a, 23b and that last processing has the corresponding final marking 25 to 28. It is also true that the masked electronic coin data set Z is valid if and only if the masked electronic coin data set Z is listed for its last processing in one of the predecessor columns 22a, 22b and this last processing has failed, that is, at least one of the corresponding required states of the markings 25 to 28 is set to "0".

It is also true that the masked electronic coin data set Z is not valid for all other cases, for example, when the masked electronic coin data set Z is not found in the monitoring entity 4, or when the last processing of the masked electronic coin data set Z is listed in one of the successor columns 23a, 23b but this last processing never became final, or when the last processing of the masked electronic coin data set Z is in one of the predecessor columns 22a, 22b and this last processing is final.

The checks by the monitoring entity 4 to determine whether a processing is final are represented by columns 25 through 28: The state in column 25 shows whether the masked electronic coin data set(s) are valid according to predecessor columns 22a, 22b. The state in column 26 indicates whether the calculation of the masked electronic coin data set is correct according to equation (10). The state in column 27 indicates whether the range proofs for the masked electronic coin data set Z were successful checked. The state in column 28 indicates whether the signature in column 24 of the masked electronic coin data set Z is a valid signature of issuing entity 1.

The state "0" in a column 25 to 28 indicates that the check was not successful. The state "1" in a column 25 to 28 thereby indicates that the check was successful. The state "-" in a column 25 to 28 indicates that no check was performed. The states can also have a different value as long as a clear distinction can be made between success/failure of a check and it is evident whether a particular check was performed.

As an example, five different processing operations are defined, which are explained in detail here. Reference is made to the corresponding list entry in FIG. 7.

For example, one processing is "generating" an electronic coin data set $C_i$. Generating in the direct transaction layer 3 by the issuing entity 1 includes selecting a monetary amount $v_i$, creating an obfuscation amount $r_i$, and generating the check value(s) $p_{ri}$ (and $p_{r2}$) as described earlier with equation (1) and FIGS. 2 to 4. As shown in FIG. 7, the "generate" processing does not require any entries/markings in columns 22a, 22b, 23b, and 25 to 27. The masked electronic coin data set $Z_i$ is registered in the successor column 23a. This registration is preferably performed before transmitting to a terminal M1 to M3, in particular or already during generation by the issuing entity 1, wherein in both cases equation (3) or equation (3a) must be performed for this purpose. The masked electronic coin data set $Z_i$ is signed by the issuing entity 1 when it is generated, this signature is entered in column 24 to ensure that the electronic coin data set $C_i$ was actually generated by an issuing entity 1, wherein other methods may also be used for this purpose. If the signature of a received $Z_i$ matches the signature in column 24, the marking in column 28 is set (from "0" to "1"). The markings according to columns 25 to 27 do not require a status change and can be ignored. The range proof is not needed because the monitoring entity 4 trusts that the issuing entity 1 does not issue negative monetary amounts. However, in an alternative embodiment, it can be sent by issuing entity 1 in the create command and checked by monitoring entity 4. In addition, in the monitoring entity, the check value(s) $p_{i1}$ (and $p_{i2}$) is stored and logged. In addition, as shown in FIG. 5, a counter value may be stored and logged.

For example, one processing is "return." Returning, i.e., destroying money (DESTROY), causes the masked electronic coin data set $Z_i$ to become invalid after the issuing entity 1 successfully executes the return command. Thus, one can no longer process the (masked) electronic coin data set to be returned in monitoring layer 4. To avoid confusion, the corresponding (non-masked) electronic coin data sets $C_i$ should be deleted in the direct transaction layer 3. When "returning", the predecessor column 22a is written to with the electronic coin data set $Z_i$, but no successor column 23a, 23b is populated. The masked electronic coin data set $Z_i$ shall be checked upon deactivation to see if the signature matches the signature as specified in column 24 to ensure that the electronic coin data set $C_i$ was indeed created by an issuing entity 1, wherein again other means may be used for this check. If the signed $Z_i$ included in the return command can be confirmed as signed by issuing entity 1 or confirmed as validly signed, marking 28 is set (from "0" to "1"). The markings according to columns 26 to 27 do not require a status change and can be ignored. The markings according to columns 25 and 28 are set after appropriate verification.

A processing is for example the "splitting". Splitting, i.e. dividing an electronic coin data set $Z_i$ into a number n, for example 2, of electronic coin data subsets $Z_j$ and $Z_k$ is first performed in the direct transaction layer 3, as still shown in FIGS. 8 and 10, wherein the monetary amounts $v_j$ and the obfuscation amount $r_j$ are generated. $v_k$ and $r_k$ are obtained by equations (7) and (8). In monitoring entity 4, markings 24 to 27 are set, predecessor column 22a is described by electronic coin data set $Z_i$, successor column 23a is described by $Z_j$, and successor column 23b is described by $Z_k$. The status changes required according to columns 24 to 27 are made after the corresponding check by the monitoring entity 4 and document the respective check result. The marking according to column 28 is ignored. Column 24 is used to enter a signature generated by the splitting terminal M1 to M3.

For example, one processing is "merging". The merging, i.e., the assembling of two electronic coin data sets $Z_i$ and $Z_j$ to form an electronic coin data set $Z_m$, is first performed in the direct transaction layer 3, as still shown in FIG. 10, wherein the monetary amount $v_m$ and the obfuscation amount $r_m$ are calculated. In the monitoring entity 2, markings 25 to 27 are set, predecessor column 22a is described by electronic coin data set $Z_i$, predecessor column 22b is described by $Z_j$, and successor column 23b is described by $Z_m$. The markings in columns 25 to 27 require status changes and the monitoring entity 2 performs the appropriate checks. A range proof must be performed to show that no new money has been generated. The marking according to column 28 is ignored. Column 24 is used to enter a signature generated by the connecting terminal M1 to M3.

For example, one processing is "switching". Switching is necessary when an electronic coin data set has been transmitted to another terminal Mx and re-issuing by the transmitting terminal (here M1) is to be excluded. When switching, also called "switch", the electronic coin data set $C_k$ received from the first terminal M1 is exchanged for a new electronic coin data set $C_l$ with the same monetary amount. The new electronic coin data set $C_l$ is generated by the second terminal M2. This switching is necessary to invalidate (make invalid) the electronic coin data set $C_k$ received from the first terminal M1, thus avoiding issuing the same electronic coin data set $C_k$ again. This is because, as long as the electronic coin data set $C_k$ is not switched, and since the first terminal M1 is aware of the electronic coin data set $C_k$, the first terminal M1 can pass this electronic coin data set $C_k$ to a third terminal M3. The switching is done, for example, by adding a new obfuscation amount $r_{add}$ to the obfuscation amount $r_k$ of the received electronic coin data set $C_k$, thereby obtaining an obfuscation amount $r_l$ that only the second terminal M2 knows. This can also be done in the monitoring entity 4. To to prove that only a new obfuscation amount $r_{add}$ has been added to the obfuscation amount $r_k$ of the masked received electronic coin data set $Z_k$, but the monetary amount has remained the same, and thus equation (11):

$$v_k = v_l \tag{11}$$

holds, then the second terminal M2 must be able to prove that $Z_l - Z_k$ can be represented as a scalar multiple of G i.e., as $r_{add}*G$. That is, only one obfuscation amount $r_{add}$ has been generated and the monetary amount of $Z_l$ is equal to the monetary amount of $Z_k$, i.e., $Z_l = Z_k + r_{add}*G$. This is done by generating a signature with the public key $Z_l - Z_k = r_{add}*G$. This signature is used in monitoring layer 4 to confirm the validity of the electronic coin data set to be switched.

The "splitting" and "merging" modifications to an electronic coin data set can also be delegated from a terminal M1 to another terminal M2, M3, for example, when a communication link to the monitoring entity 2 is not available.

FIG. 8 shows an embodiment example of a payment system according to the invention for the actions of "splitting", "merging" and "switching" of electronic coin data sets C. The check values $p_{i1}$, $p_{i2}$ are not shown for clarity. In FIG. 8, the first terminal M1 has received the coin data set $C_i$ and now wishes to perform a payment transaction not with the entire monetary amount $v_i$, but only with a partial amount $V_k$. For this purpose, the coin data set $C_i$ is divided. To do this, the monetary amount is first divided:

$$v_i = v_j + v_k \tag{12}$$

Here, each of the obtained amounts $v_j$, $v_k$, must be greater than 0, because negative monetary amounts are not allowed.

When splitting, the check values $p_{i1}$, $p_{i2}$ of the coin data set to be split are adopted unchanged into the split coin data sets.

Then a coin data subset, in this case $C_k$, together with the check values $p_{i1}$, $p_{i2}$, is transmitted from the first terminal M1 to the second terminal M2. To prevent double issuance, a switching operation is useful to exchange the electronic coin data set $C_k$ received from the first terminal M1 for a new electronic coin data set $C_l$ with the same monetary amount. The new electronic coin data set $C_l$ is generated by the second terminal M2. In this process, the monetary amount of the coin data set $C_l$ is adopted and not changed, see equation (11).

Then, according to equation (14), a new obfuscation amount $r_{add}$ is added to the obfuscation amount $r_k$ of the received electronic coin data set $C_k$, $$r_l = r_k + r_{add} \tag{14}$$

thereby obtaining an obfuscation amount $r_l$ known only to the second terminal M2. In order to prove that only a new obfuscation amount $r_{add}$ has been added to the obfuscation amount $r_k$ of the received electronic coin data set $Z_k$, but that the monetary amount has remained the same ($v_k = v_l$), the second terminal M2 must be able to prove that $Z_l - Z_k$ can be represented as a multiple of G. This can be done using the public signature $R_{add}$ according to equation (15):

$$R_{add} = r_{add} G$$

$$= Z_l - Z_k = (v_l - v_k)*H + (r_k + r_{add} - r_k)*G \quad (15)$$

where G is the generator point of the ECC. Then, the coin data set $C_l$ to be switched is masked using equation (3) or equation (3a) to obtain the masked coin data set $Z_l$. In the monitoring entity 2, the private signature $r_{add}$ can then be used to sign, for example, the masked electronic coin data set $Z_l$ to be switched, which is considered as a proof that the second terminal M2 only added an obfuscation amount $r_{add}$ to the masked electronic coin data set and no additional monetary value, i.e. $v_l = v_k$.

The proof is as follows for masking using equation (3):

$$Z_k = v_k \cdot H + r_k \cdot G$$

$$Z_l = v_l \cdot H + r_l \cdot G = v_k \cdot H + (r_k + r_{add}) \cdot G$$

$$Z_l - Z_k = (r_k + r_{add} - r_k) \cdot G$$

$$= r_{add} \cdot G \quad (16)$$

For masking using equation (3a), a signature is generated over the monetary amount $v_k$, the obfuscation amount $r_k$, and the masked coin data set Z (also referred to as R). Thus, the signature can be validated by recalculating the masking in the monitoring entity 4 to be able to prove the authenticity and existence/possession of the coin data set C.

FIG. 9 shows an embodiment example of a payment system according to the invention for merging (also called combining) electronic coin data sets. Here, the two coin data sets $C_i$ and $C_j$ are obtained in the second terminal M2. Each coin data set $C_i$ and $C_j$ thereby comprises the check values $p_{i1}$, $p_{i2}$, respectively. Following the splitting according to FIG. 8, a new coin data set $Z_m$ is now obtained by adding both the monetary amounts and the obfuscation amount of the two coin data sets $C_i$ and $C_j$. Then, the obtained coin data set $C_m$ to be merged is masked using equation (3) or equation (3a), and the masked coin data set $Z_m$ is registered in the monitoring entity. Then, when "merging", the signature of the second terminal M2 is registered, since it has received the coin data sets $C_i$ and $C_j$.

For masking using equation (3a), a first signature can be generated using the monetary amount $v_i$, the obfuscation amount $r_i$, and the masked coin data set $Z_i$, and a second signature can be generated using the monetary amount $v_j$, the obfuscation amount $r_j$, and the masked coin data set $Z_j$. Both signatures can be validated by recalculating the masking in the monitoring entity 4, respectively, to be able to prove the authenticity and existence/possession of the coin data set C. The first signature may also be combined with the second signature to form a common signature.

When combined by the payment system 2, the highest of the two individual check values of the respective electronic coin data subsets $C_i$ and $C_j$ is determined. This highest check value is adopted as the check value $C_i$ and $C_j$ of the combined electronic coin data set.

Alternatively, when combining (=merging) by a payment system 2, a new check value is determined from the sum of all check values of the electronic coin data subsets $C_i$ and $C_j$ divided by the product of the number (here two) of coin data subsets $C_i$ and $C_j$ with a constant correction value. The correction value is constant throughout the payment system. The correction value is greater than or equal to 1. Preferably, the correction value is dependent on a maximum deviation of the individual check values of the electronic coin data sets $C_i$ and $C_j$ or on a maximum check value of one of the electronic coin data sets $C_i$ and $C_j$. Further preferably, the correction value is less than or equal to 2. This new check value is adopted as the check value of the combined electronic coin data set $C_m$.

Figure 10:
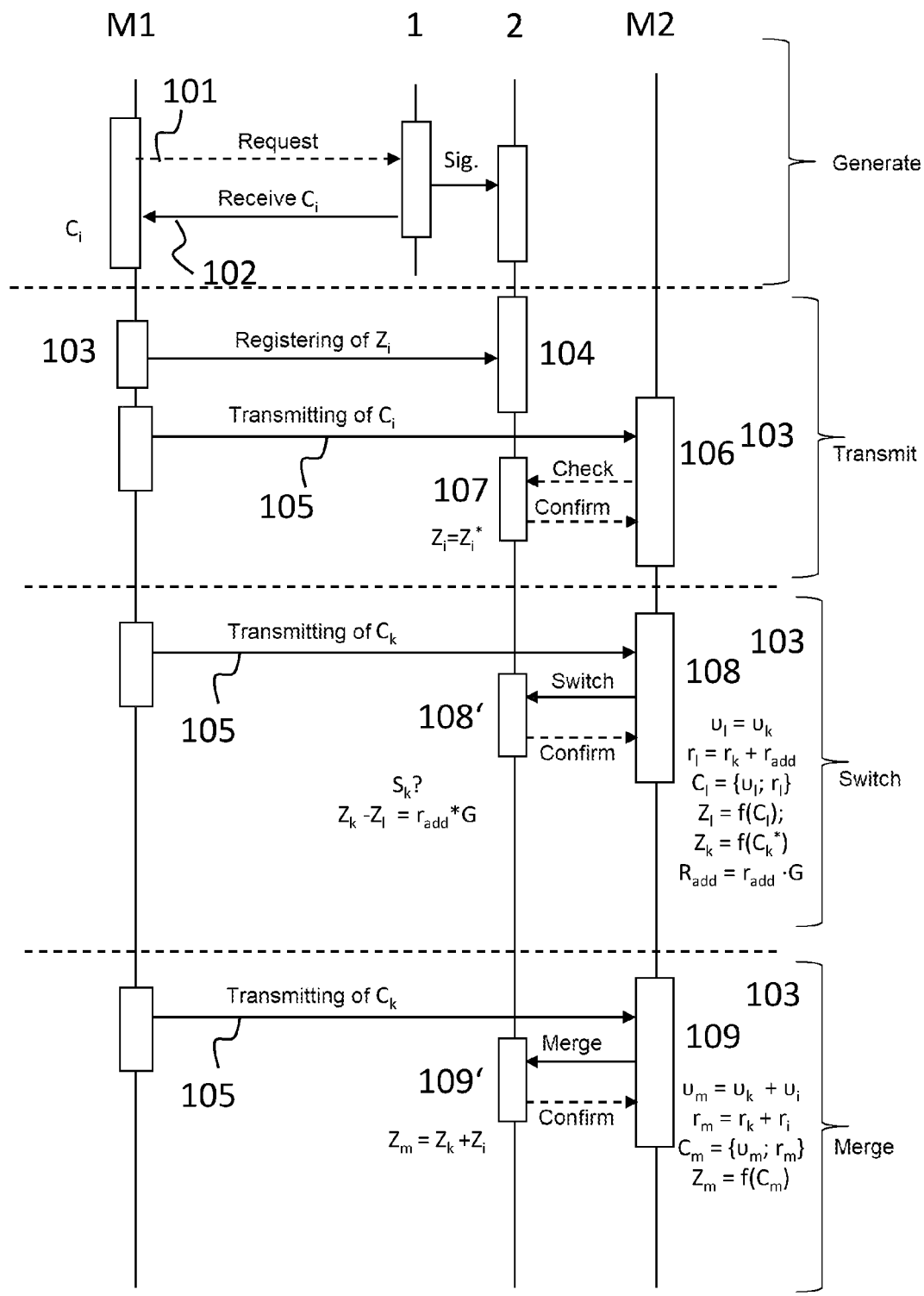
FIG. 10 an embodiment example of a process flow diagram of a method according to the invention and corresponding processing steps of a coin data set.
Figure 11:
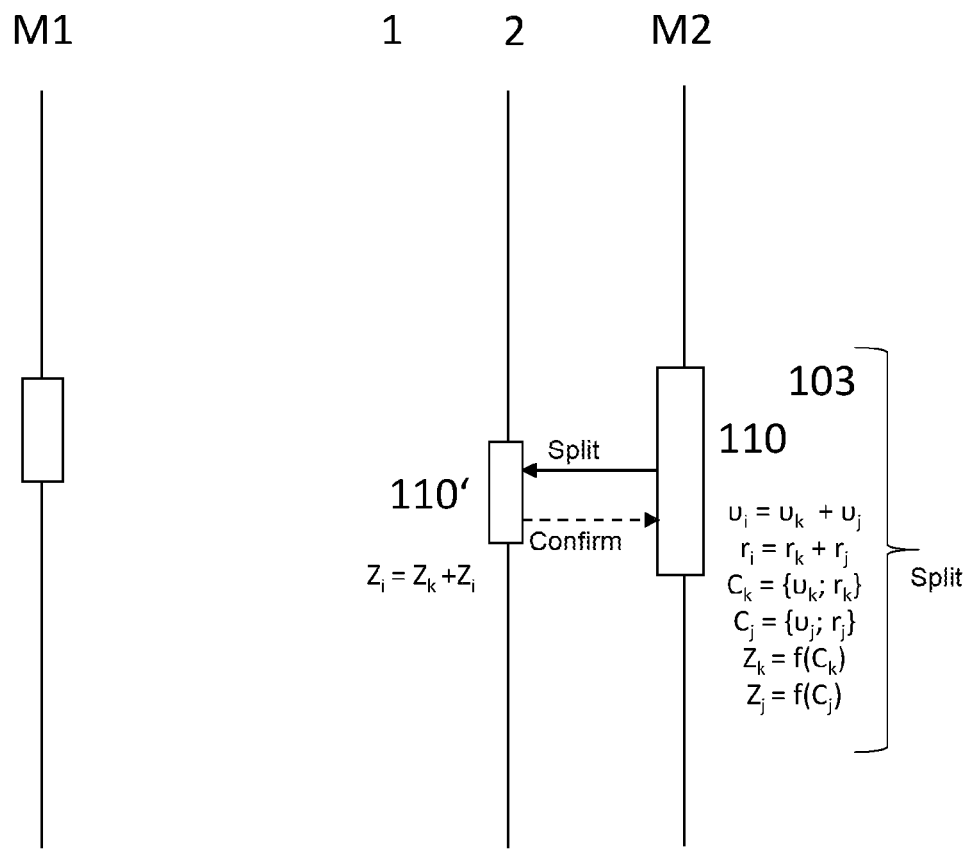
FIG. 11 an embodiment example of a process flow diagram of a method according to the invention and corresponding processing steps of a coin data set.

In the following, FIGS. 10 and 11 are described together to explain the actions of "creating", "transmitting", "switching", "merging" and "splitting". In optional steps 101 and 102, a coin data set is requested and provided on the part of the issuing entity 1 to the first terminal M1 after the electronic coin data set is created. A masked electronic coin data set is sent to the monitoring entity 4. In step 103, masking of the obtained electronic coin data set $C_i$ is performed according to equation (3). Then, in step 104, the masked electronic coin data set $Z_i$ is registered in the monitoring entity 4. Optionally, the terminal M1 can switch the received electronic coin data set. In step 105, the coin data set $C_i$ is transmitted in the direct transaction layer 3 to the second terminal M2. In optional steps 106 and 107, a validity check with prior masking is performed, in which, in the good case, the monitoring entity 2 confirms the validity of the coin data set $Z_i$ or $C_i$. In addition, the check value is checked according to the method 300 of FIGS. 2 to 4 to determine whether the coin data set is to be displayed to the monitoring entity 4 when a number of direct transfers of the coin data set has already been exceeded. In addition, it can be checked whether the coin data set is to be returned.

In step 108, switching of a received coin data set $C_k$ (of course, the received coin data set $C_i$ could also be switched) to a new coin data set $C_l$ is performed, thereby invalidating the coin data set $C_k$ and preventing double spending. To do this, the monetary amount $v_k$ of the transmitted coin data set $C_k$ is used as the "new" monetary amount $v_l$. In addition, as already explained with equations (14) to (17), the obfuscation amount $r_l$ is created. The additional obfuscation amount $r_{add}$ is used to prove that no new money (in the form of a higher monetary amount) was generated by the second terminal M2. Then the masked coin data set $Z_l$ to be switched is sent to the monitoring entity 2 and the switching from $C_k$ to $C_l$ is instructed.

In step 108', the corresponding check is made in monitoring entity 2, with $Z_k$ being entered in column 22a according to the table in FIG. 2 and the coin data set to be switched $Z_l$ being entered in column 23b. A check is then made in monitoring entity 2 to determine whether $Z_k$ is (still) valid, i.e. whether the last processing of $Z_k$ is entered in one of the columns 23a/b (as proof that $Z_k$ has not been further divided or returned or merged) and whether a check for the last processing has failed. In addition, $Z_l$ is entered in column 23b and the markings in columns 25, 26, 27 are initially set to "0". Now a check is made whether $Z_l$ is valid, wherein the check according to equations (16) and (17) can be used. In the good case, the marking in column 25 is set to "1", otherwise to "0". Now a check is made, the calculation according to equation (10) shows that $Z_k$ and $Z_l$ are valid and accordingly the marking in column 26 is set. Furthermore it is checked whether the ranges are conclusive, then the marking is set in column 27. When all checks have been successful, and this has been recorded accordingly invariantly in the monitoring entity 2, the coin data set is considered to have been switched. I.e. the coin data set $C_k$ is no longer valid and from now on the coin data set $C_l$ is valid.

The first check value of the coin data set $C_i$ is initialized by the payment system 2 with "0", since no direct transfer has taken place yet.

In step 109, two coin data sets $C_k$ and $C_i$ are merged to a new coin data set $C_m$, which invalidates the coin data sets $C_k$, $C_i$ and prevents double spending. To do this, the monetary amount $v_m$ is formed from the two monetary amounts $v_k$ and $v_i$. For this purpose, the obfuscation amount $r_m$ is formed from the two obfuscation amounts $r_k$ and $r_i$. Moreover, using equation (3), the masked coin data set $Z_m$ to be merged is obtained and it is sent (together with other information) to the monitoring entity 2 and merging is requested as processing. In addition, a signature $S_k$ and a signature $S_i$ are generated and communicated to the monitoring entity 2.

In step 109', the corresponding check is performed in the monitoring entity 2. Here, $Z_m$ is entered in column 23b according to the table in FIG. 2, which is also equal to a re-writing. A check is then made in the monitoring entity 2 as to whether $Z_k$ and $Z_i$ are (still) valid, i.e. whether the last processing of $Z_k$ or $Z_i$ is entered in one of the columns 23a/b (as proof that $Z_k$ and $Z^i$ have not been further split or deactivated or merged) and whether a check for the last processing has failed. In addition, the markings in columns 25, 26, 27 are initially set to "0". Now a check is made whether $Z_m$ is valid, wherein the check according to equations (16) and (17) can be used. In the good case the mark in column 25 is set to "1", otherwise to "0". Now a check is made, the calculation according to equation (10) shows that $Z_i$ plus $Z_k$ equals $Z_m$ and accordingly the marking in column 26 is set. Furthermore it is checked whether the ranges are conclusive, then the marking is set in column 27.

In step 110, a split of a coin data set $C_i$ into two coin data subsets $C_k$ and $C_j$ is performed, whereby the coin data set $C_i$ is invalidated and the two split coin data subsets $C_k$ and $C_j$ are to be made valid. In a split, the monetary amount $v_i$ is split into monetary partial amounts $v_k$ and $v_j$. For this purpose, the obfuscation amount $r_i$ is divided into the two obfuscation amounts $r_k$ and $r_j$. In addition, by means of equation (3), the masked coin data subsets $Z_k$ and $Z_j$ are obtained and sent to the monitoring entity 2 with further information, such as the range proofs (zero-knowledge-proofs), and the splitting is requested as processing.

In step 110', the corresponding check is performed in monitoring entity 2, with $Z_j$ and $Z_k$ being entered in columns 23a/b according to the table in FIG. 2. A check is then made in monitoring entity 2 as to whether $Z_i$ is (still) valid, i.e. whether the last processing of $Z_i$ is entered in one of the columns 23a/b (as proof that $Z_i$ has not been further divided or deactivated or merged) and whether a check for the last processing has failed. In addition, the markings in columns 25, 26, 27 are initially set to "0". Now a check is made whether $Z_j$ and $Z_k$ are valid, wherein the check according to equations (16) and (17) can be used. In the good case, the marking in column 25 is set to "1". Now a check is made, the calculation according to equation (10) shows that $Z_i$ is equal to $Z_k$ plus $Z_j$ and accordingly the marking in column 26 is set. Furthermore, it is checked whether the ranges are conclusive, then the marking is set in column 27.

Figure 12:
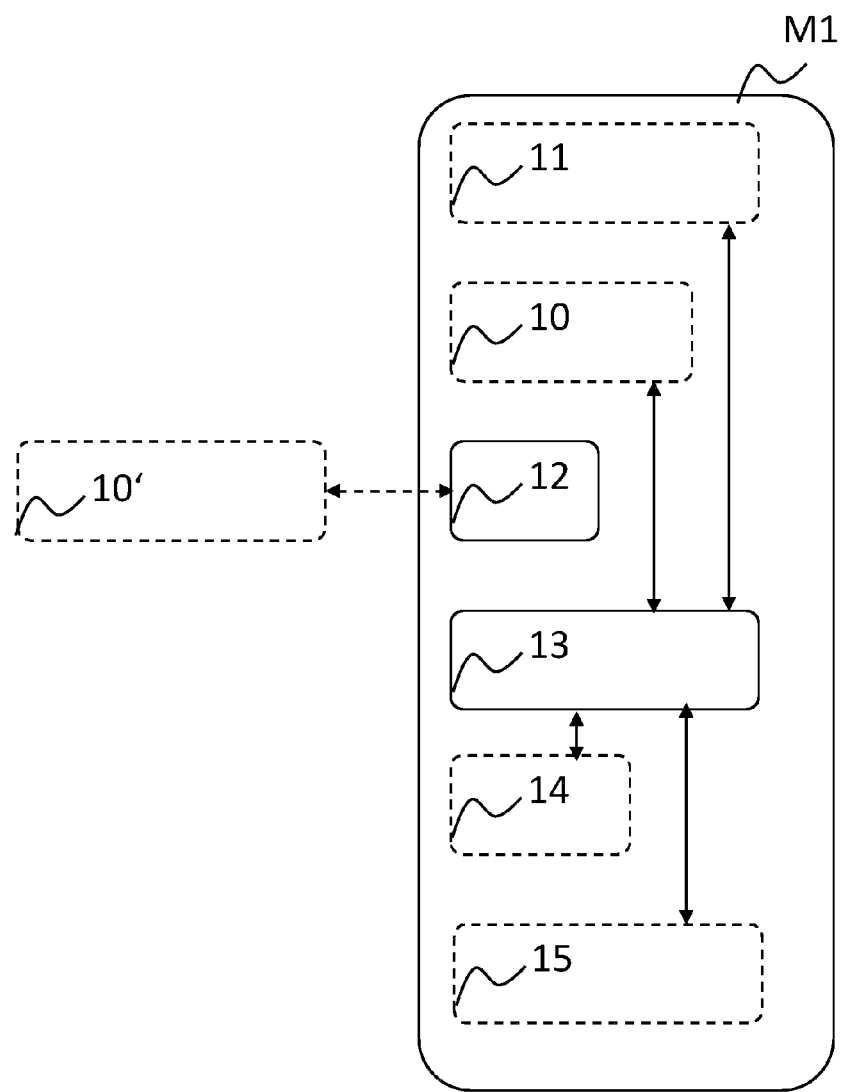
FIG. 12 an embodiment example of an apparatus according to the invention.

FIG. 12 shows an embodiment example of an apparatus M1 according to the invention. The apparatus M1 can store electronic coin data sets $C_i$ in a data storage 10, 10'. In this regard, the electronic coin data sets $C_i$ may reside on the data storage 10 of the apparatus M1 or may be available in an external data storage 10'. When using an external data storage 10', the electronic coin data sets $C_i$ could be stored in an online storage, for example a data storage 10' of a digital wallet provider. Additionally, private data storage, for example a network attached storage, NAS on a private network could also be used.

In one case, the electronic coin data set $C_i$ is shown as a hard copy printout. In this case, the electronic coin data set may be represented by a QR code, an image of a QR code, or may be a file or a string (ASCII).

The apparatus M1 has at least one interface 12 available as a communication channel for issuing the coin data set $C_i$. This interface 12 is for example an optical interface, for example for displaying the coin data set $C_i$ on a display unit (display), or a printer for printing the electronic coin data set $C_i$ as a paper printout. This interface 12 can also be a digital communication interface, for example for near-field communication, such as NFC, Bluetooth, or an internet-capable interface, such as TCP, IP, UDP, HTTP, or an access to a smart card as a security element. For example, this interface 12 is a data interface such that the coin data set $C_i$ is transmitted between apparatuses via an application, such as an instant messenger service, or as a file or string.

Moreover, the interface 12 or another interface (not shown) of the apparatus M1 is arranged to interact with the monitoring entity 2 as described in FIGS. 1 to 6. The apparatus M1 is preferably online capable for this purpose. Furthermore, the apparatus M1 may also have an interface for receiving electronic coin data sets. This interface is arranged to receive visually presented coin data sets, for example by means of a capture module such as a camera or scanner, or digitally presented coin data sets, received via NFC, Bluetooth, TCP, IP, UDP, HTTP or coin data sets presented by means of an application. The apparatus M1 also comprises a computing unit 13 capable of performing the coin data set masking method and coin data set processing operations described above.

The apparatus M1 is capable of being online and can preferably detect when it is connected to a WLAN by means of a location detection module 15. Optionally, a specific WLAN network may be marked as preferred (=location zone) so that the apparatus M1 performs special functions only when it is logged into this WLAN network. Alternatively, the location detection module 15 detects when the apparatus M1 is in predefined GPS coordinates including a defined radius and performs the special functions according to the location zone thus defined. This location zone can either be manually introduced into the apparatus M1 or via other units/modules into the apparatus M1. The special functions performed by the apparatus M1 when the location zone is detected are, in particular, the transmitting of electronic coin data sets from/to the external data storage 10 from/to a vault module 14 and, if necessary, the transmitting of masked coin data sets Z to the monitoring entity 2, for example as part of the above-mentioned processing operations on a coin data set.

In the simplest case, in the terminal M1, all coin data sets $C_i$ are automatically merged into one coin data set upon receipt (see merging-processing or join-step). That is, as soon as a new electronic coin data set is received, a merge or switch command is sent to the monitoring entity 2. The apparatus M1 can also prepare electronic coin data sets in algorithmically defined denominations and hold them in the data storage 10, 10' so that a payment process is possible even without a data connection to the monitoring entity 2.

FIG. 13 shows an overall system for better understanding. The overall system according to the invention comprises an issuing entity (central bank) 1a. In addition, further issuing entities 1b, 1c can be provided, which issue electronic coin data sets in a different currency, for example. In addition, at least one payment system 2 is shown in which at least one monitoring entity 4 is provided as a central manager of the payment system. In addition, a plurality of participants, shown as terminals Mx, is provided. For example, the payment system 2 comprises commercial banks and one (or more) central monitoring entity(ies) 4 that performs the registration of the coin data sets $C_i$ and checks and logs the modifications to the coin data set $C_i$.

Terminals M1 to M6 can directly exchange coin data sets $C_i$ and the corresponding check values $p_{i1}$, $p_{i2}$ in the direct transaction layer 3. For example, terminal M5 transmits a coin data set to terminal M4. For example, terminal M4 transmits the coin data set to terminal M3. For example, terminal M6 transmits a coin data set to terminal M1. In each sending terminal Mx or each receiving terminal Mx, the check value of the coin data set to be sent or received is used to check whether the coin data set is displayed at the payment system and/or whether the coin data set is to be returned to the issuing entity 1a, see FIGS. 2 to 4. For example, the payment system 2 checks whether the coin data set is to be returned or not based on the check value or a counter value derived from the check value for each coin data set, see FIG. 5 for more details.

When registration (switching) is to be performed as an action in the monitoring entity 4, the check value incremented in case of direct transmission is transferred from the coin data set to be switched to the switched coin data set is not adopted, but reset. Registered transfer between terminals is the rule, while direct transfer, such as between terminals M4 and M5, is more likely not. FIG. 13 shows as another example that a coin data set is transmitted from terminal M1 to terminal M2 via payment system 2 (indirect transfer). Also in this case, the payment system checks the counter value.

Within the scope of the invention, all elements described and/or drawn and/or claimed may be combined with each other as desired.

REFERENCE LIST 1, 1a-c issuing entity or bank
2 payment system
21 command entry
22a, b entry of an electronic coin data set to be processed (predecessor)
23a, b entry of a processed electronic coin data set (successor)
24 Signature entry
25 marking of validity check
26 marking of calculation check
27 marking of the range proof check
28 marking of signature check
3 direct transaction layer
4, 4', 4" monitoring layer, monitoring entity
5 Application common purse
10, 10' data storage
11 Display
12 interface
13 computing unit
14 vault module
15 location detection module
Mx x-th terminal
$C_i$ electronic coin data set
$C_j$, $C_k$ split electronic coin data subset,
$C_{j\_k}$ k-th split electronic coin data subset in case of symmetrical splitting
$C_l$ electronic coin data set to be switched
$C_m$ electronic coin data set to be merged
$Z_i$ masked electronic coin data set
$Z_j$, $Z_k$ masked split electronic coin data subset
$Z_l$ masked electronic coin data set to be switched
$Z_m$ masked coin electronic data set to be merged
S signed masked electronic coin data set
$p_{i1}$ first check value
$p_{i2}$ second check value
$v_i$ monetary amount
$v_j$, $v_j$ split monetary amount
$v_l$ monetary amount of a switched electr. coin data set/an electr. coin data set to be switched
$v_m$ monetary amount of a merged electr. coin data set/an electr. coin data set to be merged
n number of symmetrically split coin data subsets
$r_i$ obfuscation amount, random number
$r_j$, $r_j$ obfuscation amount of a split electronic coin data set
$r_m$ obfuscation amount of a merged electronic coin data set/an electronic coin data set to be merged
$C_i^*$ transmitted electronic coin data set
$C_j^*$, $C_k^*$ transmitted split electronic coin data subset,
$Z_i^*$ masked transmitted electronic coin data set
$Z_j^*$, $Z_k^*$ masked transmitted split electronic coin data set
f(C) homomorphic one-way function
$[Z_i]Sig(PK_1)$ signature of issuing entity
301-312 method steps in the terminal according to an embodiment example
201-204 method steps in the payment system according to an embodiment example

The invention claimed is:

1. A method in a terminal for managing electronic coin data sets of a payment system, wherein the electronic coin data sets are issued by a central issuing entity, the method comprising the steps of:
receiving by the terminal an electronic coin data set directly from another terminal, the coin data set having a check value,
incrementing the check value when the electronic coin data set is directly transmitted between the other terminal and the terminal;
determining by the terminal, based on the check value of the electronic coin data set, whether the electronic coin data set is returned to the central issuing entity, such that the check value increases security in the payment system,
wherein the check value represents a number of times the electronic coin data record has been transmitted.

2. The method according to claim 1, wherein the payment system requests modifying of the electronic coin data set from the terminal.

3. The method according to claim 1, wherein a counter value in the payment system concerning said electronic coin data set is determined by the payment system using the check value of the electronic coin data set.

4. The method according to claim 3, wherein the counter value is incremented with each action concerning the electronic coin data set,
wherein for different actions the counter value is incremented with different weighting.

5. The method according to claim 1, wherein each electronic coin data set has a first check value and a second check value,
wherein the first check value is incremented when directly transmitting the electronic coin data set between two terminals, and wherein it is determined based on the first check value of the electronic coin data set whether the electronic coin data set is indicated by the terminal at the payment system.

6. The method according to claim 1, wherein each electronic coin data set has a first check value and a second check value,
wherein based at least on the second check value of the electronic coin data set it is determined whether the electronic coin data set is returned to the central issuing entity.

7. The method according to claim 6, wherein the second check value is invariant to an action performed by terminals on the electronic coin data set, and
wherein the second check value is at least one value from the following list:
return date of the electronic coin data set;
issuance date of the electronic coin data set;
registration date of the electronic coin data set; and
identification value of the electronic coin data set.

8. The method according to claim 6, wherein the second check value is variable, and
wherein the second check value comprises the first check value to determine whether the electronic coin data set is returned.

9. The method according to claim 1, wherein exceeding a threshold value of the check value of the electronic coin data set is detected by the terminal and an action is performed on said electronic coin data set, the direct transmitting of this electronic coin data set from the terminal to the other terminal, is performed only when no other electronic coin data set is present in the terminal.

10. The method according to claim 1, wherein exceeding a blocking threshold value of the check value of the electronic coin data set is detected by the terminal and an action is performed with this electronic coin data set, the direct transmitting of this electronic coin data set from the terminal to the other terminal, is blocked, irrespective of whether or not another electronic coin data set is present in the terminal.

11. The method according to claim 10, wherein the threshold value of the check value is lower than the blocking threshold value of the check value.

12. A terminal, having:
a computing unit arranged to manage electronic coin data sets according to a method of claim 1;
means for accessing a data storage,
wherein at least one electronic coin data set is stored in the data storage; and
an interface arranged to output the at least one electronic coin data set to another terminal and/or for directly or indirectly returning the electronic coin data set to a central issuing entity.

13. A method in a payment system, for managing electronic coin data sets,
wherein the electronic coin data sets are issued by a central issuing entity,
wherein for each electronic coin data set a check value is present,
wherein the check value is incremented when the electronic coin data set is directly transmitted between two terminals,
wherein the method comprises the step of:
determining, by the payment system, whether the electronic coin data set is returned based on the check value of the electronic coin data set, such that the check value increases security in the payment system,
wherein the check value represents a number of times the electronic coin data record has been transmitted.

14. The method according to claim 13, wherein only masked electronic coin data sets are managed in the payment system.

15. The method according to claim 13, wherein the electronic coin data set is provided for transmitting between two terminals,
wherein the electronic coin data set to be transmitted is returned from the payment system to the issuing entity as a result of the determining, and
wherein an electronic coin data set of the payment system or a newly issued electronic coin data set is transmitted instead of the electronic coin data set to be transmitted.

16. The method according to claim 15, wherein the electronic coin data set is provided for transmitting between two terminals, and
wherein the payment system is provided for returning the electronic coin data set to be transmitted from a terminal to the issuing entity.

17. The method according to claim 13, wherein by the payment system a counter value in the payment system relating to the electronic coin data set using the check value of the electronic coin data set is determined,
wherein if a threshold value of the counter value is exceeded, the electronic coin data set is returned, directly or indirectly, to the central issuing authority.

18. The method according to claim 13, wherein each electronic coin data set has a check value that is invariant in an action performed by terminals with the electronic coin data set, and
wherein this check value is stored in the payment system for checking the return by the payment system, and
wherein the check value is at least one value from the following list:
return date of the electronic coin data set;
issuance date of the electronic coin data set;
registration date of the electronic coin data set; and
identification value of the electronic coin data set.

19. The method according to claim 13, wherein when performing an action on the electronic coin data set by the payment system, the check value of the electronic coin data set incremented during direct transmitting is reset by the payment system.

20. The method according to claim 13, wherein when combining electronic coin data subsets into a combined electronic coin data set, the highest check value of the electronic coin data subsets is determined by the payment system and this highest check value is adopted as the check value of the combined electronic coin data set.

21. The method according to claim 13, wherein, when combining electronic coin data subsets into a combined electronic coin data set by the payment system, a new check value is determined from the sum of all check values of the electronic coin data subsets divided by the product of the number of coin data subsets with a constant correction value and wherein this new check value is adopted as the check value of the combined electronic coin data set,
wherein the correction value is greater than or equal to 1 and
wherein the correction value depends on a maximum deviation of the individual check values of the electronic coin data subsets or on a maximum check value of one of the electronic coin data subsets,
wherein further the correction value is less than or equal to 2.

22. The method according to claim 13, wherein returning of the electronic coin data set from the payment system to the issuing entity is performed when the terminal initiates redeeming a monetary amount of the electronic coin data set to an account of the payment system and/or when the terminal requests a change of the monetary amount of the electronic coin data set to another currency system of the payment system.

23. A payment system comprising a monitoring entity, a first terminal and at least a second terminal,
- wherein an issuing entity is adapted to create an electronic coin data set for the payment system,
- wherein the payment system is adapted to perform the method for managing electronic coin data sets according to claim 13.

24. The payment system according to claim 23, wherein the payment system is arranged for managing electronic coin data sets from further issuing entities and/or monetary amounts as book money.

25. An electronic monitoring entity arranged to manage an electronic coin data set,
- wherein the electronic coin data set has been issued by a central issuing entity,
- wherein for each electronic coin data set there is a check value present,
- wherein the check value is incremented when the electronic coin data set is directly transmitted between two terminals or
- wherein the check value is invariant in an action performed by terminals on the electronic coin data set,
- wherein the monitoring entity comprises a non-transitory computer readable storage medium comprising computer program code arranged to perform the following when executed by one or more processors:
  - determine, based on the check value of the electronic coin data set, whether the electronic coin data set is returned, such that the check value increases security in the payment system,
- wherein the check value represents a number of times the electronic coin data record has been transmitted.

* * * * *